US012372003B2

(12) United States Patent
Sakanaka

(10) Patent No.: US 12,372,003 B2
(45) Date of Patent: Jul. 29, 2025

(54) STEAM TURBINE PLANT AND METHOD FOR IMPROVING SAME

(71) Applicant: MITSUBISHI HEAVY INDUSTRIES, LTD., Tokyo (JP)

(72) Inventor: Yoshikazu Sakanaka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/841,073

(22) PCT Filed: Jan. 25, 2023

(86) PCT No.: PCT/JP2023/002163
§ 371 (c)(1),
(2) Date: Aug. 23, 2024

(87) PCT Pub. No.: WO2023/176155
PCT Pub. Date: Sep. 21, 2023

(65) Prior Publication Data

US 2025/0179927 A1 Jun. 5, 2025

(30) Foreign Application Priority Data

Mar. 17, 2022 (JP) ................................ 2022-042175

(51) Int. Cl.
*F01D 11/04* (2006.01)
*F01D 11/06* (2006.01)
*F01K 9/00* (2006.01)

(52) U.S. Cl.
CPC .............. *F01D 11/06* (2013.01); *F01D 11/04* (2013.01); *F01K 9/00* (2013.01); *F05D 2240/63* (2013.01)

(58) Field of Classification Search
CPC . F01D 11/04; F01K 23/10; F16J 15/40; F05D 2240/63
See application file for complete search history.

(56) References Cited

U.S. PATENT DOCUMENTS 4,290,609 A * 9/1981 Dumont .................. F01D 11/04 277/432
4,517,804 A 5/1985 Ura et al.
8,650,878 B2 * 2/2014 Mehra ..................... F01D 11/06 60/657

FOREIGN PATENT DOCUMENTS

JP 46-005843 B 2/1971
JP 59-051109 A 3/1984
(Continued)

OTHER PUBLICATIONS

International Search Report dated Apr. 4, 2023, issued in counterpart Application No. PCT/JP2023/002163. (4 pages).
(Continued)

*Primary Examiner* — Justin D Seabe
(74) *Attorney, Agent, or Firm* — WHDA, LLP

(57) ABSTRACT

A steam turbine plant includes a steam turbine including a first gland seal provided on one side in an axial direction of a turbine rotor and a second gland seal provided on the other side in the axial direction of the turbine rotor and a gas extraction system including a gas extractor configured to extract noncondensable gas in a condenser on a downstream side of the steam turbine. Only a first discharge system for discharging a gas flowing into the first gland seal is connected to the first gland seal, and a second discharge system for discharging a gas flowing into the second gland seal is connected to the second gland seal. The first and second discharge systems are connected to the gas extraction system so as to guide a gas flowing into the first and second gland seals to the gas extractor without passing through the condenser.

12 Claims, 12 Drawing Sheets

(56) References Cited

FOREIGN PATENT DOCUMENTS

| | | | |
|---|---|---|---|
| JP | 08-200013 | A | 8/1996 |
| JP | 10-103018 | A | 4/1998 |
| JP | 2000-027749 | A | 1/2000 |

OTHER PUBLICATIONS

Written Opinion dated Apr. 4, 2023, issued in counterpart Application No. PCT/JP2023/002163, with English Translation. (15 pages).

* cited by examiner

STEAM TURBINE PLANT AND METHOD FOR IMPROVING SAME

TECHNICAL FIELD

The present invention relates to a steam turbine plant and a method for improving the same and relates particularly to a plant including a shaft seal system of a steam turbine and a method for improving the same.

BACKGROUND ART

A steam turbine used for a power plant or the like drives a load of a generator or the like by a turbine rotor being rotationally driven by steam supplied from a steam generation source. In the steam turbine, the turbine rotor is accommodated in a casing, and a shaft portion of the turbine rotor penetrates the casing. Thus, a gap is formed between the shaft portion of the turbine rotor and the penetrating part of the casing. Regarding the steam turbine plant, to prevent leakage of steam inside a turbine to the outside of a casing via the gap and inflow of air (outside air) outside the turbine to the inside of the turbine via the gap, a known system provides a gland seal in the gap and seals a shaft by supplying gland steam to the gland seal (see, for example, Patent Document 1).

The technique described in Patent Document 1 configures, in a geothermal condensing turbine in which a condenser in a following stage of the turbine and a gas extractor that extracts noncondensable gas from the condenser and discharges the noncondensable gas to the outside of the system are combined, a gland steam exhaust system as follows. The gland steam exhaust system is configured to connect a gland steam discharge line drawn from a gland packing portion of the turbine to a suction side of the gas extractor connected to the condenser via a throttle (orifice) for pressure regulation. This gland steam exhaust system discharges, to the outside of the system (the atmosphere) via the gas extractor, gland leakage steam and air (outside air) sucked from a shaft end together with the noncondensable gas extracted from the condenser.

CITATION LIST

Patent Literature

Patent Document 1: JP 2000-27749 A

SUMMARY OF INVENTION

Technical Problem

It is important for the steam turbine plant including a condenser to prevent inflow of outside air (air) into the turbine via the above-described gap. The reason is that the air is a noncondensable gas and that the degree of vacuum of the condenser decreases when the air (outside air) flowing into the turbine finally flows into and stays in the condenser. When the degree of vacuum of the condenser decreases, the exhaust pressure of the turbine increases and the turbine output decreases. As a result, the efficiency of the steam turbine plant decreases. To suppress such decrease in plant efficiency, inflow of outside air (air) into the turbine needs to be prevented.

Supplying a gland packing with gland steam as in the geothermal condensing turbine plant described in Patent Document 1 is an effective means for preventing inflow of outside air (air) into the turbine. Unfortunately, such a technique includes a facility for supplying gland steam to the gland packing, for example, a gland steam header and a gland steam supply line. A steam turbine plant is required to simplify its system configuration. The present inventors have studied a shaft seal system of a steam turbine that prevents inflow of outside air (air) into a turbine without feeding gland steam.

The present invention has been made to solve the above problems, and an object thereof is to provide a steam turbine plant that can simplify a shaft seal system of a steam turbine while preventing inflow of outside air into the steam turbine and a method for improving the same.

Solution to Problem

The present application includes a plurality of means for solving the above problems, and an example thereof includes a steam turbine plant including: a steam turbine configured to be driven by steam supplied from a steam generation source; a condenser configured to condense steam discharged from the steam turbine and convert the steam into water; and a gas extraction system including a gas extractor configured to extract noncondensable gas in the condenser and connected to the condenser. The steam turbine includes a turbine rotor that includes a first shaft portion and a second shaft portion on one side in an axial direction and the other side in the axial direction, respectively and is rotationally driven by the steam supplied from the steam generation source, a casing that accommodates the turbine rotor with the first shaft portion and the second shaft portion penetrating, and a first gland seal provided in a first gap between the first shaft portion and the casing and a second gland seal provided in a second gap between the second shaft portion and the casing. Only a first discharge system for discharging a gas flowing into the first gland seal is connected to the first gland seal. Only a second discharge system for discharging a gas flowing into the second gland seal is connected to the second gland seal. The first discharge system is connected to the gas extraction system so as to guide the gas flowing into the first gland seal to the gas extractor without passing through the condenser. The second discharge system is connected to the gas extraction system so as to guide the gas flowing into the second gland seal to the gas extractor without passing through the condenser.

Advantageous Effects of Invention

The present invention allows the outside air flowing into the first gland seal and the second gland seal to be sucked by using the gas extractor for retaining the degree of vacuum of the condenser, thus allowing inflow of the outside air into the steam turbine via the first gland seal and the second gland seal to be prevented without supplying gland steam to the first gland seal and the second gland seal. Therefore, the shaft seal system of the steam turbine needs no facility for supplying gland steam to the first gland seal and the second gland seal. That is, it is possible to simplify the shaft seal system of the steam turbine while preventing inflow of outside air into the steam turbine.

Problems, configurations, and effects other than those described above will be clarified by the following description of embodiments.

DESCRIPTION OF EMBODIMENTS

Hereinafter, embodiments of the steam turbine plant of the present invention and the method for improving the same will be described with reference to the drawings. The embodiments of the present invention are suitable for a steam turbine plant using geothermal steam.

First Embodiment

Figure 1:
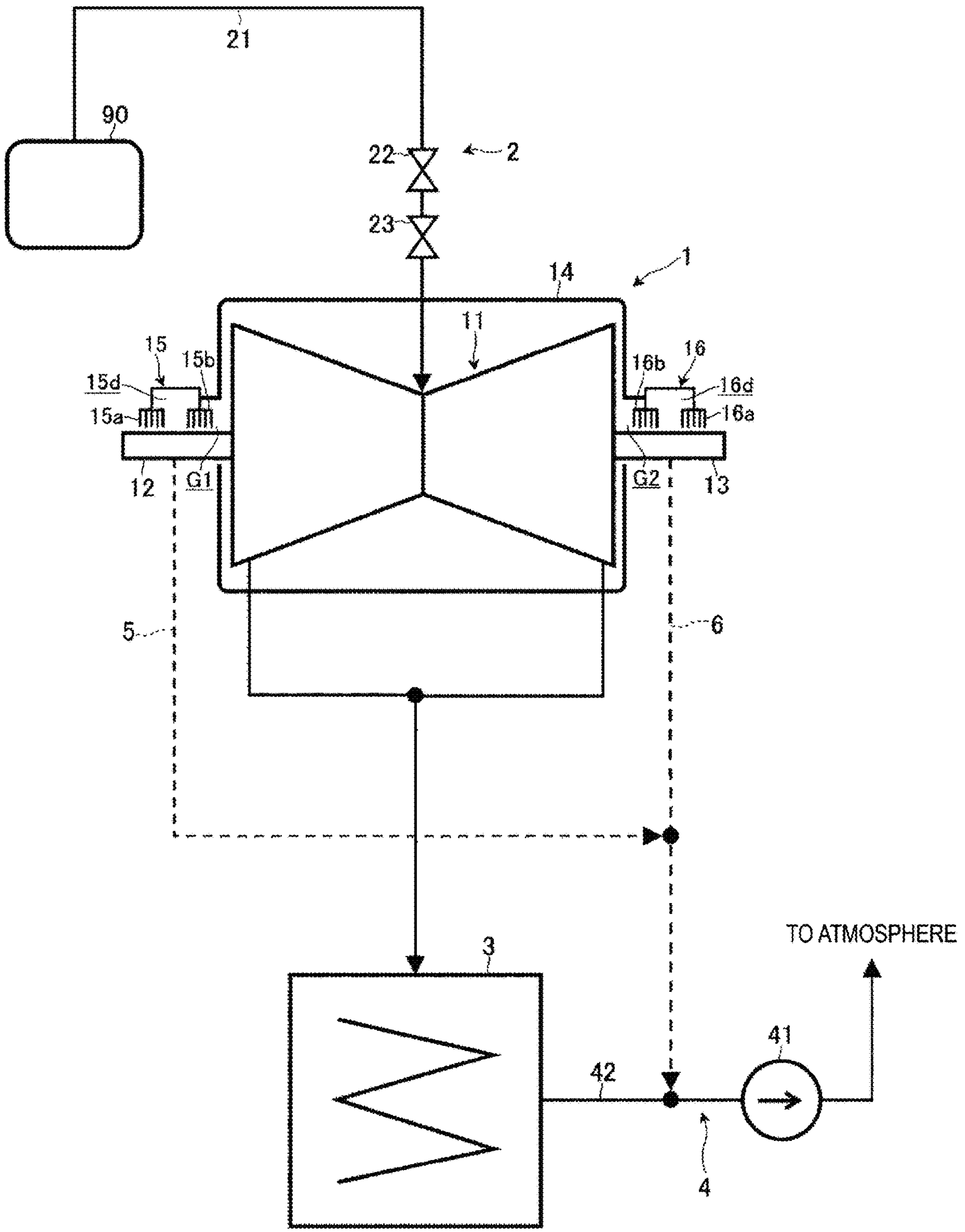
FIG. 1 is a system diagram illustrating a schematic configuration of a steam turbine plant according to a first embodiment of the present invention and a schematic diagram illustrating a schematic configuration of a steam turbine.
Figure 2:
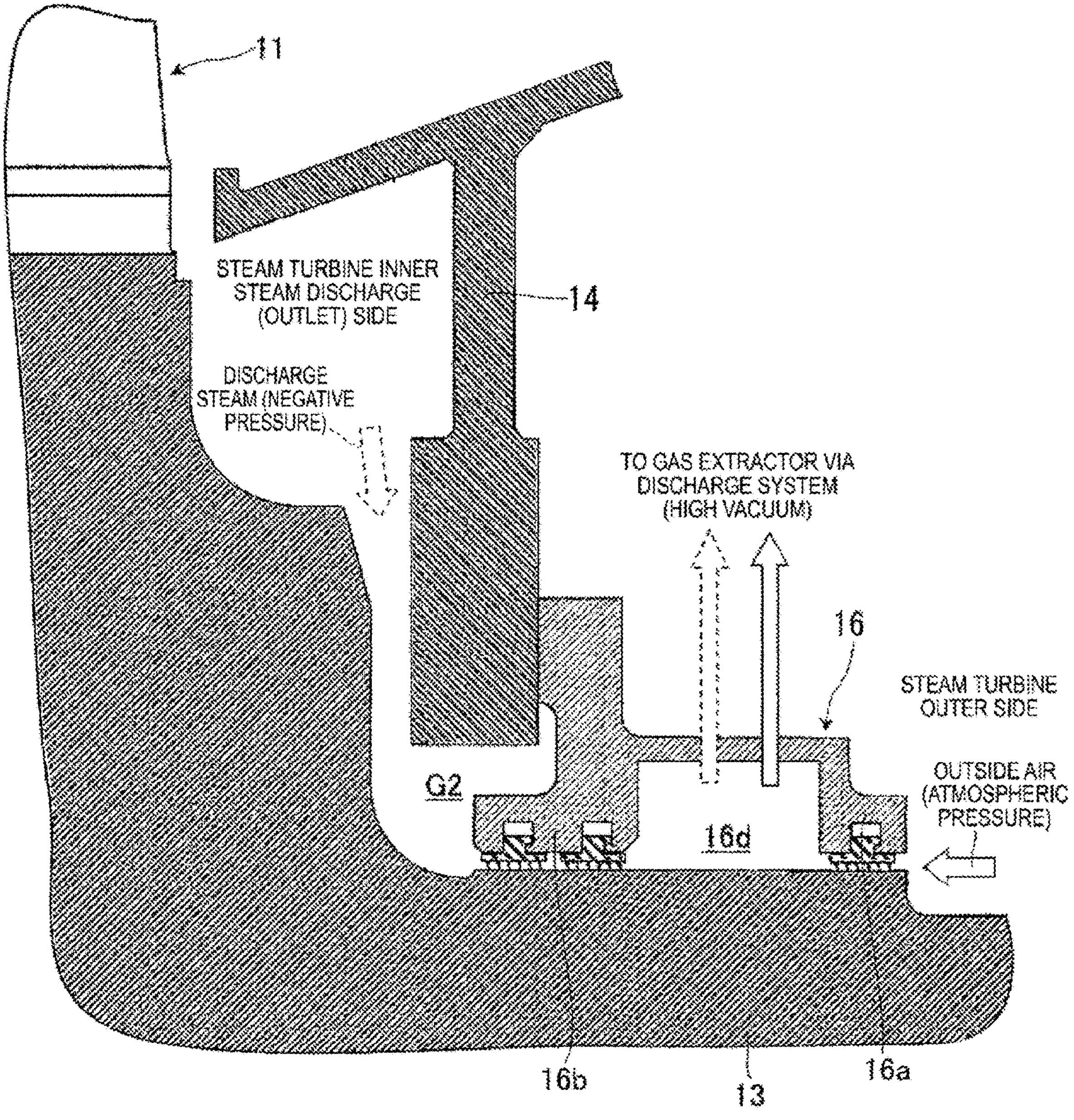
FIG. 2 is a cross-sectional view illustrating a structure of a gland seal of the steam turbine in the steam turbine plant according to the first embodiment illustrated in FIG. 1.

A schematic configuration of the steam turbine plant according to the first embodiment of the present invention will be described with reference to FIGS. 1 and 2. FIG. 1 is a system diagram illustrating a schematic configuration of the steam turbine plant according to the first embodiment and a schematic diagram illustrating a schematic configuration of the steam turbine. FIG. 2 is a cross-sectional view illustrating the structure of the gland seal of the steam turbine in the steam turbine plant according to the first embodiment illustrated in FIG. 1.

In FIG. 1, the steam turbine plant includes a steam turbine 1 driven by steam supplied from a steam generation source 90, a main steam system 2 that guides the steam of the steam generation source 90 to the steam turbine 1, a condenser 3 that cools the steam discharged from the steam turbine 1 to condense and return, to water, the steam, and a gas extraction system 4 connected to the condenser 3. Steam turbine plants are plants used in geothermal power generation, thermal power generation, nuclear power generation, and the like. Examples of the steam generation source 90 include a steam well that ejects geothermal steam generated by geothermal energy, a boiler that generates steam by combustion energy of fuel, and a nuclear reactor that generates steam by nuclear energy. The configuration of the steam turbine 1 will be described later.

The main steam system 2 includes a main steam line 21 connecting the steam generation source 90 and the steam turbine 1, and a main steam stop valve 22 and a main steam control valve 23 that are installed in order from an upstream side on the main steam line 21. The main steam line 21 is a line through which main steam supplied from the steam generation source 90 to the steam turbine 1 flows. The main steam stop valve 22 switches supply of the main steam to the steam turbine 1 or shut-off of the supply. The main steam control valve 23 regulates a flow rate of the main steam introduced into the steam turbine 1.

The condenser 3 brings the inside into a very low pressure state close to vacuum by condensing steam that is a gas discharged from the steam turbine 1 and returns the steam to water, which is a liquid. When the inside of the condenser 3 is retained at a very low pressure, a large pressure difference is generated between the inlet side and the outlet side of the steam turbine 1, and therefore a turbine rotor 11 can be efficiently rotationally driven. For this reason, the condenser 3 needs to be retained at equal to or greater than a predetermined degree of vacuum. However, in the condenser 3, noncondensable gas such as air contained in steam may be stayed. In particular, in the case of geothermal power generation, the ratio of the noncondensable gas (e.g., carbon dioxide gas and methane gas) contained in steam is larger than that in the case of thermal power generation or nuclear power generation.

The gas extraction system 4 extracts the noncondensable gas in the condenser 3 in order to retain the degree of vacuum of the condenser 3 at equal to or greater than the predetermined level. Specifically, the gas extraction system 4 includes a gas extractor 41 that extracts noncondensable gas in the condenser 3, and a gas extraction line 42 connecting the condenser 3 and the gas extractor 41. As the gas extractor 41, for example, a vacuum pump driven by a drive source such as an electric motor, an ejector using gas such as steam as a drive source, or a combination thereof is used. For example, the gas extraction system 4 releases, to the atmosphere, the noncondensable gas extracted from the inside of the condenser 3.

The steam turbine 1 includes the turbine rotor 11 rotationally driven by the steam supplied from the steam generation source 90, and a casing 14 accommodating the turbine rotor 11. The steam turbine 1 is made up of, for example, a double-flow exhaust turbine in which steam supplied from the steam generation source 90 is divided in two directions, rotationally drives the turbine rotor 11, and is discharged from two directions of one side in an axial direction (left side in FIG. 1) and the other side in the axial direction (right side in FIG. 1) of the turbine rotor 11. The turbine rotor 11 includes at least one rotor blade row on each of axial both sides with a steam introduction portion (inlet) as a center (illustrated as a schematic diagram). The turbine rotor 11 includes a first shaft portion 12 and a second shaft portion 13 on one side in the axial direction and the other side in the axial direction, respectively. The casing 14 accommodates the turbine rotor 11 with the first shaft portion 12 and the second shaft portion 13 penetrating. A first gap G1 is formed between the first shaft portion 12 of the turbine rotor 11 and the casing 14. Similarly, a second gap G2 is formed between the second shaft portion 13 of the turbine rotor 11 and the casing 14.

The first gap G1 is provided with a first gland seal 15 sealing the first gap G1. Similarly, the second gap G2 is provided with a second gland seal 16 sealing the second gap G2. The first gland seal 15 includes a first seal portion 15*a* and a second seal portion 15*b* disposed in this order at an interval from the outside to the inside of the steam turbine 1. The first gland seal 15 includes only one chamber 15*d* sectioned by the first seal portion 15*a* and the second seal portion 15*b*. Similarly, the second gland seal 16 includes a first seal portion 16*a* and a second seal portion 16*b* disposed in this order at an interval from the outside to the inside of the steam turbine 1. The second gland seal 16 includes only one chamber 16*d* sectioned by the first seal portion 16*a* and the second seal portion 16*b*. The chamber 15*d* of the first gland seal 15 and the chamber 16*d* of the second gland seal 16 are formed as spaces separating the outside and the inside of the steam turbine 1, and capable of regulating the relative pressure with respect to the outside and the inside of the steam turbine 1.

For example, as illustrated in FIG. 2, the first seal portion 16*a* of the second gland seal 16 is a non-contact seal portion including one labyrinth packing having a plurality of fins. The second seal portion 16*b* of the second gland seal 16 is a non-contact seal portion including two sets of labyrinth packings having a plurality of fins. In the second gland seal 16, one chamber 16*d* is formed by the first seal portion 16*a*, the second seal portion 16*b*, and a portion connecting them. The chamber 16*d* is connected to the gas extraction system 4 via a discharge system (discharge line 6 illustrated in FIG. 1) described later, thus regulating the pressure such that the air (outside air) outside the steam turbine 1 and the steam inside the steam turbine 1 flow in.

The first gland seal 15 also has a structure similar to that of the second gland seal 16 illustrated in FIG. 2. That is, the first seal portion 15*a* and the second seal portion 15*b* of the first gland seal 15 are non-contact seal portions having similar structures to those of the first seal portion 16*a* and the second seal portion 16*b* of the second gland seal 16. The chamber 15*d* of the first gland seal 15 is positioned between the outside and the inside of the steam turbine 1 and is connected to the gas extraction system 4 via a discharge system (discharge line 5 illustrated in FIG. 1) described later, thereby functioning as a space in which a relative pressure with respect to the pressure outside and inside the steam turbine 1 can be regulated.

As illustrated in FIG. 1, the steam turbine plant according to the present embodiment includes a shaft seal system of the steam turbine 1 that does not need supply of gland steam to the first gland seal 15 and the second gland seal 16. That is, the present steam turbine plant does not need a facility for supplying gland steam to the first gland seal 15 and the second gland seal 16.

Specifically, only a first discharge system 5 for discharging the gas flowing into the chamber 15*d* of the first gland seal 15 is connected to the first gland seal 15. Here, "only the discharge system 5 is connected to" means that there is no system for intentionally supplying gland steam into at least the chamber 15*d*. The same applies to the present embodiment described below. The first discharge system 5 is connected to the gas extraction system 4 so as to guide the gas (air (outside air) outside the steam turbine 1, steam inside the steam turbine 1, and the like) flowing into the first gland seal 15 to a suction side of the gas extractor 41 without passing through the condenser 3. For example, the first discharge system 5 is made up of only a discharge line having one side connected to the chamber 15*d* of the first gland seal 15 and the other side connected to the gas extraction line 42 of the gas extraction system 4. The first discharge system (discharge line) 5 is configured to avoid installation of, for example, a pressure regulation mechanism (e.g., a mechanism that intentionally loses the pressure of a fluid such as a throttle or a valve, and a structurally unavoidable mechanism, for example, the surface roughness of the inner surface of the pipe is not applicable, the same applies to the following) that regulates the pressure by pressure loss of the fluid.

Similarly, only a second discharge system 6 for discharging the gas flowing into the chamber 16*d* of the second gland seal 16 is connected to the second gland seal 16. The second discharge system 6 is connected to the gas extraction system 4 so as to guide the gas flowing into the second gland seal 16 to the suction side of the gas extractor 41 without passing through the condenser 3. For example, the second discharge system 6 is made up of only a discharge line having one side connected to the chamber 16*d* of the second gland seal 16 and the other side connected to the gas extraction line 42 of the gas extraction system 4. The second discharge system (discharge line) 6 is also configured to avoid installation of a pressure regulation mechanism (e.g., a throttle, a valve, or the like) that regulates the pressure by pressure loss of the fluid, for example.

In the present embodiment, connecting the chamber 15*d* of the first gland seal 15 to the gas extractor 41 of the gas extraction system 4 via the first discharge system 5 makes, in operation of the steam turbine plant (during drive of the steam turbine 1 and the gas extractor 41), the pressure of the chamber 15*d* lower than the atmospheric pressure outside the steam turbine 1 and lower than the pressure on a steam discharge side (outlet side) inside the steam turbine 1. Similarly, connecting the chamber 16*d* of the second gland seal 16 to the gas extractor 41 of the gas extraction system 4 via the second discharge system 6 makes, in operation of the steam turbine plant, the pressure of the chamber 16*d* lower than the atmospheric pressure outside the steam turbine 1 and lower than the pressure on the steam discharge side (outlet side) inside the steam turbine 1.

In this manner, the shaft seal system of the steam turbine 1 in the steam turbine plant according to the present embodiment has a configuration in which supply of gland steam to the first gland seal 15 and the second gland seal 16 is unnecessary by connecting the first gland seal 15 and the second gland seal 16 to the gas extractor 41 of the gas extraction system 4 via the first discharge system 5 and the second discharge system 6, respectively.

As described above, the steam turbine plant according to the present embodiment is configured such that the pressure in the chambers 15*d* and 16*d* of the first and second gland seals 15 and 16 is made lower than the pressure on the steam discharge side (outlet side) inside the steam turbine 1 by the gas extractor 41. Therefore, the gas extractor 41 needs to have a capacity capable of retaining the degree of vacuum of the condenser 3 at equal to or greater than the predetermined level and retaining the pressure of the chambers 15*d* and 16*d* of the first gland seal 15 and the second gland seal 16 at a pressure lower than the pressure on the steam discharge side in the steam turbine 1. The capacity of the gas extractor 41 is set to equal to or greater than a predetermined threshold value. The threshold value is determined based on a total amount of steam to be condensed required for the condenser 3, for example. Details of a method for determining the capacity of the gas extractor 41 will be described later.

Figure 3:
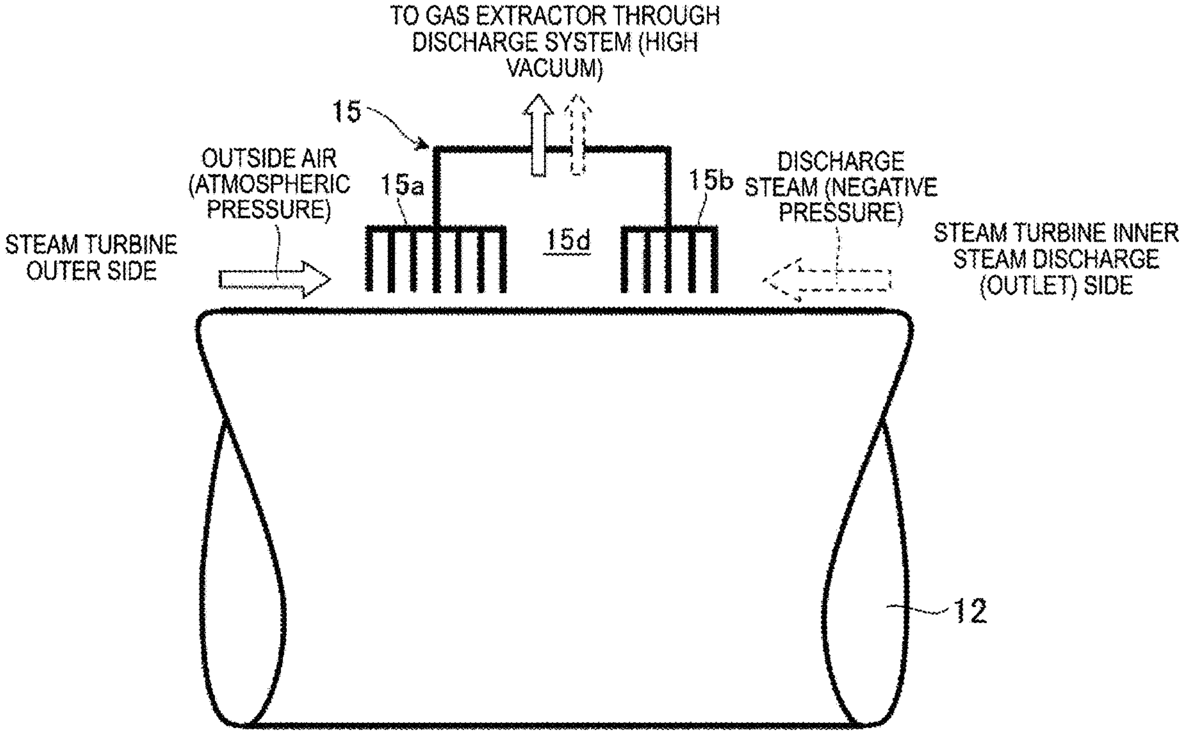
FIG. 3 is an explanatory diagram illustrating an action of a shaft seal system of the steam turbine in the steam turbine plant according to the first embodiment.

Next, the action of the shaft seal system of the steam turbine in the steam turbine plant according to the first embodiment will be described with reference to FIGS. 1 to 3. FIG. 3 is an explanatory diagram illustrating the action of the shaft seal system of the steam turbine in the steam turbine plant according to the first embodiment. In FIGS. 2 and 3, solid arrows indicate the flow of outside air, and broken arrows indicate the flow of steam.

In the steam turbine plant of the present embodiment illustrated in FIG. 1, high pressure steam generated by the steam generation source 90 is supplied to the steam turbine 1 via the main steam line 21. At this time, the steam flow rate supplied to the steam turbine 1 is regulated by the main steam control valve 23. In an emergency, the supply of steam to the steam turbine 1 is instantaneously shut off by the main steam stop valve 22.

The high pressure steam supplied to a center portion in the axial direction of the steam turbine 1 is divided into two directions toward the one side in the axial direction (left side in FIG. 1) and the other side in the axial direction (right side in FIG. 1), and rotationally drives the turbine rotor 11 while reducing the pressure. The steam having driven the turbine rotor 11 is discharged from both sides (two directions) of the one side in the axial direction and the other side in the axial direction of the steam turbine 1 and guided to the condenser 3. The steam flowing into the condenser 3 is cooled, condensed, and returns to water. In the condenser 3, the steam of the gas is changed into liquid water and the volume is rapidly reduced, bringing the condenser 3 into a state that is very low in pressure and close to vacuum.

In the condenser 3, when the steam flowing in from the steam turbine 1 is condensed, noncondensable gas such as air contained in the steam remains. The noncondensable gas remaining in the condenser 3 is extracted and released to the atmosphere by the gas extractor 41 of the gas extraction system 4. Due to this, since the degree of vacuum of the condenser 3 is retained high, a decrease in the efficiency of the steam turbine 1 can be prevented.

In such a double-flow exhaust steam turbine plant, the pressure on the steam discharge (outlet) side on the one side in the axial direction and the other side in the axial direction of the steam turbine 1 is a negative pressure close to the pressure in the condenser 3. Therefore, as illustrated in FIGS. 1 to 3, the pressure on the inner side of the steam turbine 1 relative to the second seal portions 15*b* and 16*b* of the first and second gland seals 15 and 16 is a very low negative pressure close to the pressure inside the condenser 3. On the other hand, the pressure on the outer side of the steam turbine 1 relative to the first seal portions 15*a* and 16*a* of the first and second gland seals 15 and 16 is the pressure of the outside air, that is, the atmospheric pressure. Therefore, air (outside air) on the outer side of the steam turbine 1 tends to flow into the steam turbine 1 having a relatively low pressure via the first and second gland seals 15 and 16.

In the present embodiment, the chambers 15*d* and 16*d* of the first and second gland seals 15 and 16 are connected to the gas extractor 41 via the first and second discharge systems 5 and 6 (discharge lines). Therefore, the chambers 15*d* and 16*d* are in a high vacuum state at a pressure lower than the pressure on the steam discharge (outlet) side inside the steam turbine 1 by the suction force of the gas extractor 41. Therefore, the air (outside air) on the outer side of the steam turbine 1 flows into the chambers 15*d* and 16*d* in the high vacuum state via the first seal portions 15*a* and 16*a* of the first and second gland seals 15 and 16 and is sucked by the gas extractor 41 via the first and second discharge systems 5 and 6. The negative pressure steam present in the vicinity of the first and second gland seals 15 and 16 inside the steam turbine 1 flows into the chambers 15*d* and 16*d* in the high vacuum state via the second seal portions 15*b* and 16*b* of the first and second gland seals 15 and 16, and is sucked by the gas extractor 41 together with the outside air. Therefore, the outside air (air) from flowing into the steam turbine 1 having a relatively low pressure via the first and second gland seals 15 and 16 can be prevented without supply of gland steam.

The present embodiment is configured to avoid installation of a pressure regulation mechanism (e.g., a throttle, a valve, or the like) that regulates the pressure by pressure loss of the fluid with respect to the discharge lines of the first and second discharge systems 5 and 6 that connect the chambers 15*d* and 16*d* of the first and second gland seals 15 and 16 and the gas extractor 41. Due to this, since the inside of the chambers 15*d* and 16*d* of the first and second gland seals 15 and 16 can be reliably brought into a high vacuum state, the pressure of the chambers 15*d* and 16*d* are retained lower than the pressure inside the steam turbine 1. Therefore, the outside air (air) from flowing into the steam turbine 1 can be reliably prevented.

Here, the action of the shaft seal system of the steam turbine 1 in load operation (precisely, in high load operation) of the steam turbine plant has been described. The action of the shaft seal system of the steam turbine 1 at start-up of the steam turbine plant (precisely, a period from vacuum rise to low load operation) is also similar to that in load operation. Also at start-up of the steam turbine plant, similarly to the time of load operation, the condenser 3 is retained in a state close to vacuum by drive of the gas extractor 41. Therefore, the pressure on the steam discharge (outlet) side on the one side in the axial direction and the other side in the axial direction inside the steam turbine 1 becomes a very low negative pressure. On the other hand, the pressures of the chambers 15*d* and 16*d* of the first and second gland seals 15 and 16 are also brought into a high vacuum state by drive of the gas extractor 41. Therefore, the magnitude relationship between the pressures of the chambers 15*d* and 16*d* of the first and second gland seals 15 and 16 and the pressures inside and outside the steam turbine 1 has no difference between at start-up of the steam turbine plant and at the time of the load operation.

Figure 4:
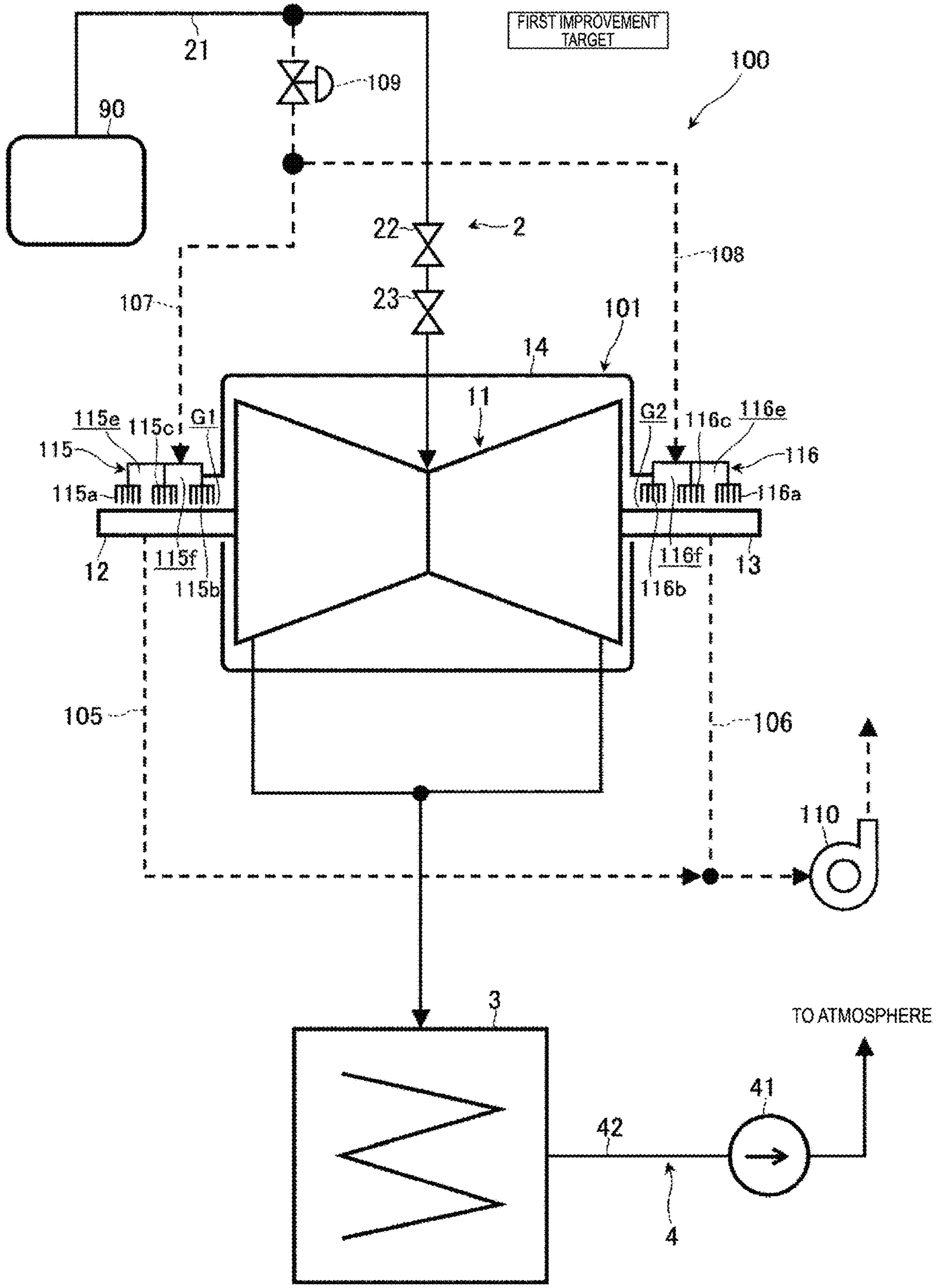
FIG. 4 is a system diagram illustrating a schematic configuration of an existing steam turbine plant that is a first improvement target with respect to the steam turbine plant according to the first embodiment and a schematic diagram illustrating a schematic configuration of an existing steam turbine.
Figure 5:
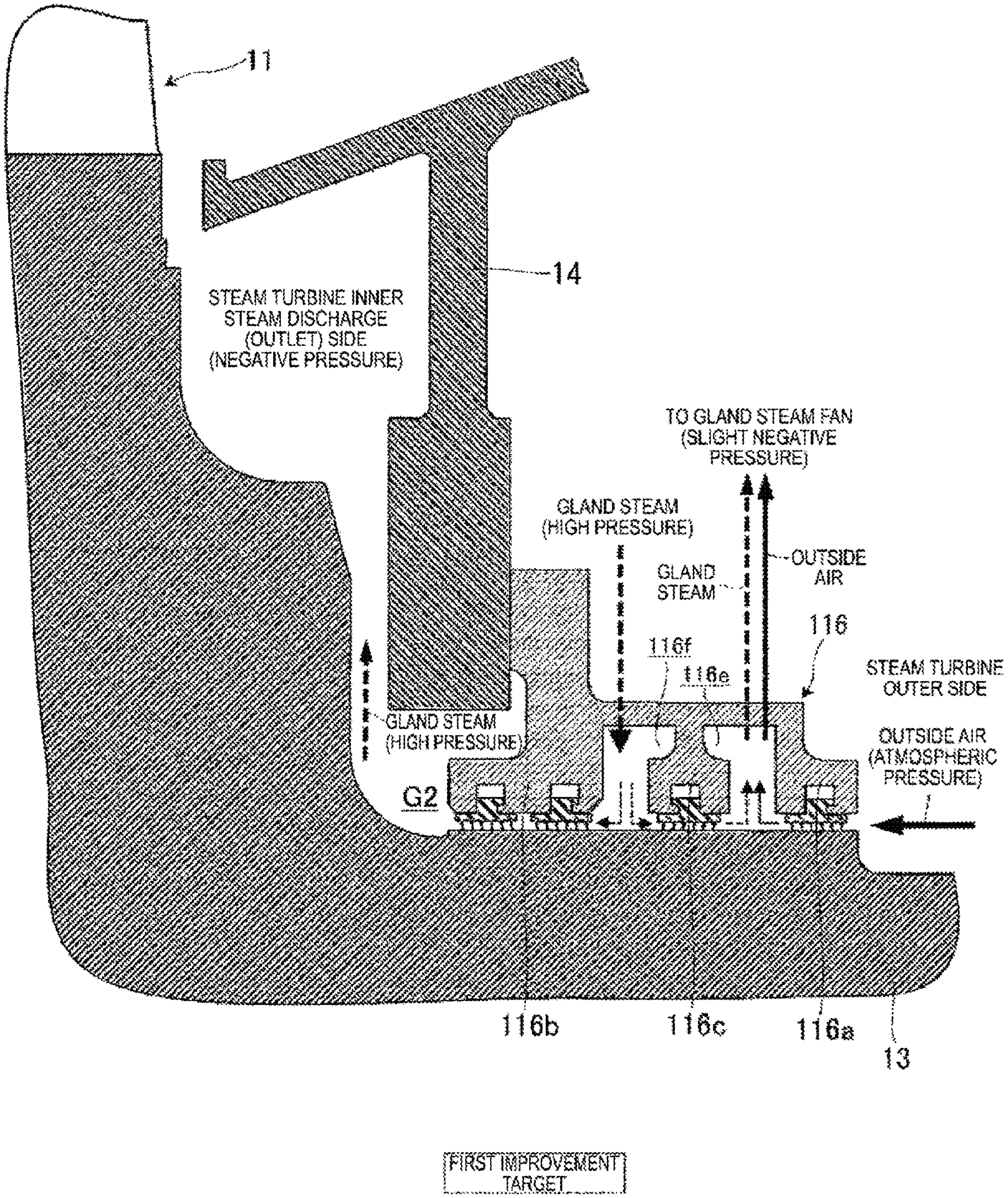
FIG. 5 is a cross-sectional view illustrating a structure of a gland seal of the steam turbine in the steam turbine plant of the first improvement target (existing) illustrated in FIG. 4.

Next, the method for improving the steam turbine plant according to the first embodiment of the present invention will be described. First, a schematic configuration of an existing steam turbine plant of the first improvement target with respect to the steam turbine plant according to the first embodiment will be described with reference to FIGS. 4 and 5. FIG. 4 is a system diagram illustrating a schematic configuration of the existing steam turbine plant that is the first improvement target with respect to the steam turbine plant according to the first embodiment and a schematic diagram illustrating a schematic configuration of the existing steam turbine. FIG. 5 is a cross-sectional view illustrating the structure of the gland seal of the steam turbine in the steam turbine plant of the first improvement target (existing) illustrated in FIG. 4. In FIGS. 4 and 5, parts having the same reference signs as those illustrated in FIGS. 1 to 3 are similar parts, and thus detailed descriptions thereof will be omitted.

The configuration of a steam turbine plant 100 of the first improvement target (existing) illustrated in FIG. 4 is different from the configuration of the steam turbine plant according to the present embodiment in that the configuration and structure of the shaft seal system (part connected by the broken line) of a steam turbine 101 are different. In particular, use of gland steam for shaft seal of the steam turbine 101 is different. Specifically, the shaft seal system of a steam turbine 101 in the steam turbine plant 100 of the first improvement target includes a first gland seal 115 and a second gland seal 116 respectively disposed on an one side in the axial direction (left side in FIG. 4) and the other side in the axial direction (right side in FIG. 4) of the turbine rotor 11, a gland steam supply system that supplies gland steam to the first gland seal 115 and the second gland seal 116, and a discharge system for guiding and discharging, to the outside of the shaft seal system, the gas flowing into the first gland seal 115 and the second gland seal 116.

The gland steam supply system is made up of, for example, a first supply system 107 as a supply line diverging from the main steam line 21 and connected to the first gland seal 115, and a second supply system 108 as a supply line diverging from the main steam line 21 and connected to the second gland seal 116. That is, part of the steam supplied from the steam generation source 90 to the steam turbine 101 is used as gland steam. The pressure and flow rate of the gland steam are regulated by a regulator valve 109.

The discharge system is configured to include a first discharge system 105 as a discharge line connected to the first gland seal 115, a second discharge system 106 as a discharge line connected to the second gland seal 116, and a gland steam fan 110 connected to the first discharge system 105 and the second discharge system 106. The discharge system of the shaft seal system of the steam turbine 101 is configured as a system independent of the gas extraction system 4 including the gas extractor 41.

Here, an example of a configuration in which the steam turbine plant 100 of the first improvement target uses the steam generation source 90 that supplies high pressure steam to the steam turbine 101 as a supply source of gland steam has been described. However, the supply source of the gland steam is discretionary as long as the supply source can supply steam having a pressure higher than atmospheric pressure.

As illustrated in FIGS. 4 and 5, the first gland seal 115 and the second gland seal 116 of the steam turbine 101 include first seal portions 115*a* and 116*a*, second seal portions 115*c* and 116*c*, and third seal portions 115*b* and 116*b* disposed in this order at intervals from the outside to the inside of the steam turbine 101. The first gland seal 115 and the second gland seal 116 include first chambers 115*e* and 116*e* sectioned by the first seal portions 115*a* and 116*a* and the second seal portions 115*c* and 116*c*, and second chambers 115*f* and 116*f* sectioned by the second seal portions 115*c* and 116*c* and the third seal portions 115*b* and 116*b*. The second chambers 115*f* and 116*f* of the first and second gland seals 115 and 116 are formed as spaces dividing the outside and the inside of the steam turbine 101 and supplied with the gland steam. On the other hand, the first chambers 115*e* and 116*e* of the first and second gland seals 115 and 116 are formed as spaces capable of dividing the outside and the inside of the steam turbine 101 and regulating the relative pressure with respect to the outside of the steam turbine 1 and the adjacent second chambers 115*f* and 116*f*.

For example, as illustrated in FIG. 5, the first seal portion 116*a* of the second gland seal 116 is a non-contact seal portion including one labyrinth packing having a plurality of fins. The second seal portion 116*c* is a non-contact seal portion including one labyrinth packing having a plurality of fins, similarly to the first seal portion 116*a*, for example. The third seal portion 116*b* is a non-contact seal portion including two sets of labyrinth packings having a plurality of fins, for example. In the second gland seal 116, the first chamber 116*e* is formed by the first seal portion 116*a*, the second seal portion 116*c*, and a portion connecting them, and the second chamber 116*f* is formed by the second seal portion 116*c*, the third seal portion 116*b*, and a portion connecting them. The first gland seal 115 also has a structure similar to that of the second gland seal 116 illustrated in FIG. 5. That is, the first seal portion 115*a*, the second seal portion 115*c*, and the third seal portion 115*b* of the first gland seal 115 are non-contact seal portions having similar structures to those of the first seal portion 116*a*, the second seal portion 116*c*, and the third seal portion 116*b* of the second gland seal 116. In the first gland seal 115, the first chamber 115*e* is formed by the first seal portion 115*a*, the second seal portion 115*c*, and a portion connecting them, and the second chamber 115*f* is formed by the second seal portion 115*c*, the third seal portion 115*b*, and a portion connecting them. As illustrated in FIG. 4, the first supply system 107 is connected to the second chamber 115*f* of the first gland seal 115. Similarly, the second supply system 108 is connected to the second chamber 116*f* of the second gland seal 116. The second chambers 115*f* and 116*f* of the first and second gland seals 115 and 116 are configured to be a space having a pressure higher than that of the steam discharge (outlet) side outside the steam turbine 101 and inside the steam turbine 101 by being supplied with high pressure gland steam via the first supply system 107 and the second supply system 108.

The first chamber 115*e* of the first gland seal 115 is connected to the gland steam fan 110 via the first discharge system 105. Similarly, the first chamber 116*e* of the second gland seal 116 is connected to the gland steam fan 110 via the second discharge system 106. As illustrated in FIGS. 4 and 5, the gland steam fan 110 sucks a gas (air (outside air) from the outside of the steam turbine 101 and gland steam from the second chambers 115*f* and 116*f*) flowing into the first chambers 115*e* and 116*e* of the first and second gland seals 115 and 116. The gland steam fan 110 is configured as an exhaust fan having a suction force so as to retain the pressure of the first chambers 115*e* and 116*e*, for example, at a negative pressure (hereinafter, sometimes called slight negative pressure) slightly lower than the atmospheric pressure. That is, the first chambers 115*e* and 116*e* of the first and second gland seals 115 and 116 are configured as spaces whose pressures are regulated by the suction force of the gland steam fan 110 so that the air (outside air) outside the steam turbine 1 and the gland steam in the second chamber 116*f* flow in.

In the steam turbine plant 100 of the first improvement target (existing) configured as described above, the shaft seal system of the steam turbine 101 operates as follows at the time of load operation and at start-up of the plant 100.

As illustrated in FIGS. 4 and 5, high pressure gland steam is supplied to the second chambers 115*f* and 116*f* of the first and second gland seals 115 and 116 via the first and second supply systems 107 and 108. Furthermore, the gland steam fan 110 is driven, causing the pressures of the first chambers

115*e* and 116*e* of the first and second gland seals 115 and 116 to have slight negative pressures.

The gland steam supplied to the second chambers 115*f* and 116*f* is higher in pressure than the pressure (negative pressure in accordance with the pressure of the condenser 3) on the steam discharge (outlet) side in the steam turbine 101 and is also higher in pressure than the pressure (slight negative pressure) of the first chambers 115*e* and 116*e*. Therefore, the gland steam in the second chambers 115*f* and 116*f* flows into the steam turbine 101 having a relatively low pressure via the third seal portions 115*b* and 116*b* and flows into the first chambers 115*e* and 116*e* having a relatively low pressure via the second seal portions 115*c* and 116*c*. Outside air (air) on the outer side of the steam turbine 1 flows into the first chambers 115*e* and 116*e* having a relatively low pressure via the first seal portions 115*a* and 116*a*. The gland steam and the outside air (air) flowing into the first chambers 115*e* and 116*e* are sucked by the gland steam fan 110 via the first and second discharge systems 105 and 106.

In this manner, the shaft seal system of the steam turbine 101 in the steam turbine plant 100 of the first improvement target (existing) prevents, by supplying the high pressure gland steam to the first and second gland seals 115 and 116, the air (outside air) on the outer side of the steam turbine 101 from flowing into the steam turbine 101 having a relatively low pressure via the first and second gland seals 115 and 116. Therefore, the shaft seal system of the steam turbine 101 of the first improvement target (existing) requires a facility for supplying the gland steam to the first and second gland seals 115 and 116, for example, the first and second supply systems 107 and 108 and the like.

However, the existing steam turbine plant is required to have a simplified system configuration. Therefore, as a result of the studies, the present inventors have found a shaft seal system of the steam turbine 1 according to the present embodiment described above that can prevent inflow of outside air (air) into the turbine without feeding gland steam.

Next, the method for improving the steam turbine plant according to the first embodiment with respect to the existing steam turbine plant of the first improvement target described above will be described with reference to FIGS. 1, 2, 4, and 5.

As described above, in the existing steam turbine plant 100 of the first improvement target, as illustrated in FIG. 4, the steam turbine 101 is made up of a double-flow exhaust turbine. Furthermore, the shaft seal system of the steam turbine 101 includes a first gland seal 115 and a second gland seal 116 respectively disposed on an one side in the axial direction (left side in FIG. 4) and the other side in the axial direction (right side in FIG. 4) of the turbine rotor 11, a gland steam supply system that supplies gland steam to the first gland seal 115 and the second gland seal 116, and a discharge system for guiding and discharging, to the outside, the gas flowing into the first gland seal 115 and the second gland seal 116. The gland steam supply system is configured to include the first supply system 107 connected to the first gland seal 115 and the second supply system 108 connected to the second gland seal 116. The discharge system is made up of the first discharge system 105 connected to the first gland seal 115, the second discharge system 106 connected to the second gland seal 116, and the gland steam fan 110 connected to the first discharge system 105 and the second discharge system 106.

The steam turbine plant 100 of the first improvement target having such a configuration can be improved to a configuration corresponding to the steam turbine plant according to the first embodiment by performing the following modifications.

First, the gland steam supply system including the first and second supply systems 107 and 108 in the shaft seal system of the existing steam turbine 101 illustrated in FIG. 4 is abolished. This modification can achieve an improvement into a shaft seal system not requiring supply of gland steam, as the shaft seal system of the steam turbine 1 in the steam turbine plant according to the first embodiment illustrated in FIG. 1.

Second, of the first seal portions 115*a* and 116*a*, the second seal portions 115*c* and 116*c*, and the third seal portions 115*b* and 116*b* of the first and second gland seals 115 and 116 of the steam turbine 101 illustrated in FIGS. 4 and 5, the second seal portions 115*c* and 116*c* are abolished. With this modification, the seal portion including the first chambers 115*e* and 116*e* sectioned by the first seal portions 115*a* and 116*a* and the second seal portions 115*c* and 116*c* and the second chambers 115*f* and 116*f* sectioned by the second seal portions 115*c* and 116*c* and the third seal portions 115*b* and 116*b* is modified to a seal portion including only one chamber sectioned by the first seal portions 115*a* and 116*a* and the third seal portions 115*b* and 116*b*. That is, it is possible to improve the existing first and second gland seals 115 and 116 to configurations corresponding to the first and second gland seals 15 and 16 (seal portion including only the chambers 15*d* and 16*d* sectioned by the first seal portions 15*a* and 16*a* and the second seal portions 15*b* and 16*b*) of the steam turbine 1 illustrated in FIGS. 1 and 2 in the steam turbine plant according to the first embodiment.

Third, the gland steam fan 110 constituting a part of the discharge system in the shaft seal system of the existing steam turbine 101 illustrated in FIG. 4 is abolished.

Fourth, the portions connected to the gland steam fan 110 in the first and second discharge systems 105 and 106 of the discharge system of the shaft seal system of the existing steam turbine 101 illustrated in FIG. 4 are connected to the gas extraction system 4 so as to guide the gas flowing into the first and second gland seals 115 and 116 to the gas extractor 41 without passing through the condenser 3. Furthermore, one side connected to the first chambers 115*e* and 116*e* of the existing first and second gland seals 115 and 116 in the existing first and second discharge systems 105 and 106 is connected to portions corresponding to the chambers 15*d* and 16*d* of the first and second gland seals and 16 of the present embodiment obtained by improving the existing first and second gland seals 115 and 116. This modification can achieve an improvement into a configuration corresponding to the first and second discharge systems 5 and 6 in the shaft seal system of the steam turbine 1 according to the first embodiment illustrated in FIG. 1.

In this manner, improving the existing steam turbine plant 100 of the first improvement target illustrated in FIG. 4 to the steam turbine plant according to the first embodiment illustrated in FIG. 1 allows the outside air flowing into the first and second gland seals 15 and 16 to be sucked, without flowing into the steam turbine 1, by the gas extractor 41 having a strong suction force for retaining the degree of vacuum of the condenser 3. Therefore, inflow of the outside air into the steam turbine 1 via the first and second gland seals 15 and 16 can be prevented without supplying gland steam to the first and second gland seals 15 and 16.

Figure 6:
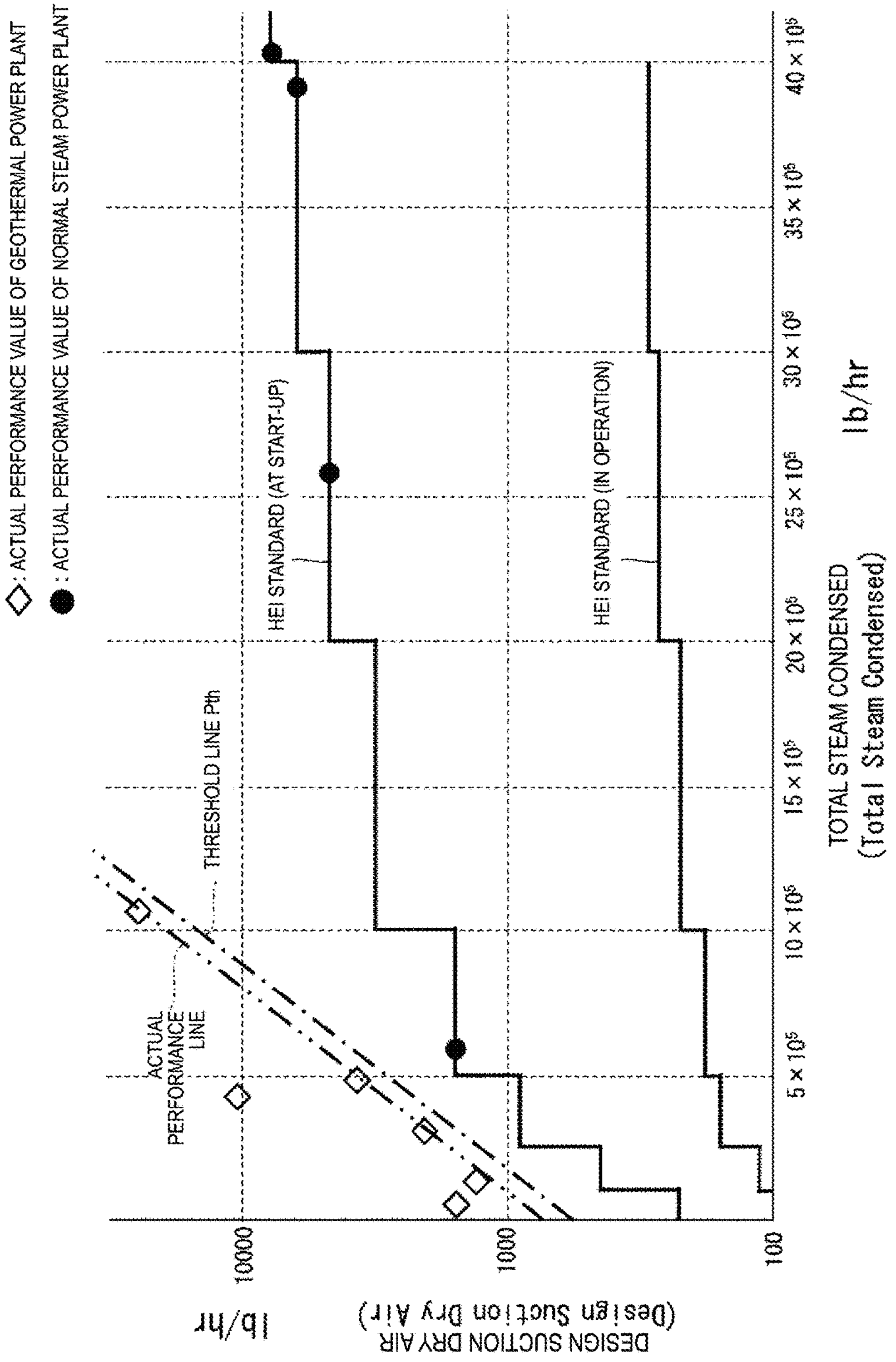
FIG. 6 is an explanatory diagram illustrating a method for defining a threshold value (lower limit) of the capacity of the gas extractor in the steam turbine plant according to the first embodiment illustrated in FIG. 1.

Next, the capacity of the gas extractor constituting a part of the shaft seal system of the steam turbine in the steam turbine plant according to the first embodiment will be described with reference to FIG. 6. FIG. 6 is an explanatory diagram illustrating the method for defining the threshold value (lower limit) of the capacity of the gas extractor in the steam turbine plant according to the first embodiment illustrated in FIG. 1. In FIG. 6, the transverse axis represents a total amount of steam to be condensed (Total Steam Condensed) required for the condenser, and the vertical axis represents a design amount of suction dry air (Design Suction Dry Air) that is the capacity of the gas extractor. The units of the steam of the condenser and the capacity of the gas extractor is lb/hr.

In general, the capacity of the gas extractor used to retain the degree of vacuum of the condenser is defined by the Heat Exchange Institute standard (HEI standard) indicated by the solid line in FIG. 6 (at start-up and in operation of the steam turbine plant), for example. However, this HEI standard is assumed to extract noncondensable gas such as air contained in steam discharged to a condenser from a steam turbine used in a thermal power plant or the like.

However, the gas extractor 41 of the present embodiment has an additional function of extracting, without flowing into the steam turbine 1, the outside air (air) flowing into the chambers 15*d* and 16*d* of the first and second gland seals 15 and 16, in addition to the normal function of extracting the noncondensable gas such as the air contained in the steam discharged from the steam turbine 1 to the condenser 3. For this reason, it has not been found whether inflow of outside air into the steam turbine 1 via the first and second gland seals 15 and 16 can be prevented in a case of applying the HEI standard to the capacity of the gas extractor 41 according to the first embodiment.

Therefore, the inventor of the present application has studied a capacity at which the gas extractor 41 of the present embodiment can maintain the above-described additional function, extracted a geothermal power plant capable of maintaining the above-described additional function, and obtained a threshold line $P_{th}$ indicated by the one-dot chain line in FIG. 6 based on an actual performance value in the plant. That is, the threshold value (lower limit) of the capacity of the gas extractor 41 is determined according to the total amount of steam to be condensed by the condenser 3 using the threshold line $P_{th}$ indicated by the one-dot chain line in FIG. 6.

Specifically, a regression line passing through three plots at the lower limit of the distribution of the actual performance value indicating the relationship between the capacity of the gas extractor in the geothermal power plant and the total amount of steam to be condensed by the condenser is calculated, and the regression line of the calculation result is assumed to be an actual performance line of 100%. In the case of a geothermal power plant, a ratio of noncondensable gas (e.g., carbon dioxide gas, methane gas, or the like) contained in steam is larger than that in a thermal power plant or a nuclear power plant. Therefore, the capacity of the gas extractor is set to be larger than that in a case of use in thermal power generation or the like with respect to the steam of the condenser. The regression line (actual performance line) obtained based on the actual performance value of the geothermal power plant is calculated as the following equation.

$$Y=10^{(2.881+(1.401\times10^{-6})X)} \quad \text{[Math. 1]}$$

where X represents a total amount of steam to be condensed required for the condenser, and Y represents the capacity of the gas extractor. The units of X and Y are lb/hr.

In consideration of variation in data and the margin of performance with respect to this actual performance line, 75% of the actual performance line is determined as the threshold line $P_{th}$. That is, the threshold line $P_{th}$ is calculated as the following equation.

$$Y=0.75\times10^{2.881+(1.401\times10^{-6})X)} \quad \text{[Math. 2]}$$

In this manner, the threshold value (lower limit) of the capacity of the gas extractor 41 according to the present embodiment is determined by the threshold line $P_{th}$. Therefore, the capacity of the gas extractor 41 is larger than that in a case of applying the HEI standard. In particular, in a case where a large amount of noncondensable gas is contained in main steam for driving a steam turbine, which is typical to a geothermal power plant, a gas extractor having a capacity with a sufficient margin for the HEI standard is often installed. In a case of applying such an existing power plant with the present embodiment, there is an advantage that the existing gas extractor can be used as it is without introducing a new gas extractor, and a facility for supplying gland steam can be removed.

As described above, the steam turbine plant according to the first embodiment includes the steam turbine 1 driven by steam supplied from the steam generation source 90, the condenser 3 that condenses the steam discharged from the steam turbine 1 and returns the steam to water, and the gas extraction system 4 including the gas extractor 41 that extracts the noncondensable gas in the condenser 3 and connected to the condenser 3. The steam turbine 1 includes the turbine rotor 11 having the first shaft portion 12 and the second shaft portion 13 on one side in the axial direction and the other side in the axial direction, respectively and rotationally driven by steam supplied from the steam generation source 90, the casing 14 accommodating the turbine rotor 11 with the first shaft portion 12 and the second shaft portion 13 penetrating, and the first gland seal 15 provided in the first gap G1 between the first shaft portion 12 and the casing 14 and the second gland seal 16 provided in the second gap G2 between the second shaft portion 13 and the casing 14. Only the first discharge system 5 for discharging the gas flowing into the first gland seal 15 is connected to the first gland seal 15, and only the second discharge system 6 for discharging the gas flowing into the second gland seal 16 is connected to the second gland seal 16. The first discharge system 5 is connected to the gas extraction system 4 so as to guide, to the gas extractor 41 without passing through the condenser 3, the gas flowing into the first gland seal 15, and the second discharge system 6 is connected to the gas extraction system 4 so as to guide, to the gas extractor 41 without passing through the condenser 3, the gas flowing into the second gland seal 16.

This configuration allows the outside air flowing into the first and second gland seals 15 and 16 to be sucked by using the gas extractor 41 for retaining the degree of vacuum of the condenser 3, allowing inflow of the outside air into the steam turbine 1 via the first and second gland seals 15 and 16 to be prevented without supplying gland steam to the first and second gland seals 15 and 16. Therefore, the shaft seal system of the steam turbine 1 does not need a facility for supplying the gland steam to the first and second gland seals and 16. That is, it is possible to simplify the shaft seal system of the steam turbine 1 while preventing inflow of outside air into the steam turbine 1.

This configuration allows inflow of the outside air into the steam turbine 1 via the first and second gland seals 15 and 16 to be prevented without supplying gland steam to the first and second gland seals 15 and 16, allowing for supplying the steam turbine 1 with the steam supplied as the gland steam. As a result, the output of the steam turbine 1 can be increased.

According to this configuration, in a case of a plant using geothermal steam, it is not necessary to use, as gland steam, geothermal steam containing a corrosive component such as chloride or sulfide, and therefore the risk of corrosion of the first and second gland seals 15 and 16 can be reduced.

In the steam turbine plant according to the present embodiment, the gas extractor 41 has a capacity equal to or greater than a predetermined threshold value, and the threshold value is determined based on the total amount of steam to be condensed required for the condenser 3.

This configuration can set the capacity of the gas extractor 41 so as to include an additional function of further extracting the outside air (air) flowing into the first and second gland seals 15 and 16 in addition to the normal function of extracting the noncondensable gas from the condenser 3.

Furthermore, in the steam turbine plant according to the present embodiment, the threshold value of the capacity of the gas extractor 41 is defined by the following equation.

$$Y=0.75\times10^{(2.881+(1.401\times10^{-6})X)} \quad \text{[Math. 3]}$$

where X represents total amount of steam to be condensed required for the condenser, and Y represents the capacity of the gas extractor. The units of the variables X and Y is lb/hr.

According to this configuration, the capacity of the gas extractor 41 is set to be equal to or greater than a threshold value obtained based on the actual performance value of the geothermal power plant, thus allowing for reliably preventing inflow of outside air into the steam turbine 1 via the first and second gland seals 15 and 16 due to capacity shortage of the gas extractor 41.

The steam turbine 1 in the steam turbine plant according to the present embodiment is made up of a double-flow exhaust turbine in which steam supplied from the steam generation source 90 is divided in two directions, rotationally drives the turbine rotor 11, and is discharged from two directions of one side in the axial direction and the other side in the axial direction of the turbine rotor 11. The first gland seal 15 of the steam turbine 1 includes the first seal portion 15*a* and the second seal portion 15*b* arranged at intervals from the outer side toward the inner side of the steam turbine 1 and include only one chamber 15*d* that is sectioned by the first seal portion 15*a* and the second seal portion 15*b* and is pressure-regulatable. The second gland seal 16 of the steam turbine 1 includes the first seal portion 16*a* and the second seal portion 16*b* arranged at intervals from the outer side toward the inner side of the steam turbine 1 and include only one chamber 16*d* that is sectioned by the first seal portion 16*a* and the second seal portion 16*b* and is pressure-regulatable. The first discharge system 5 is made up of the first discharge line having one side connected to the chamber 15*d* of the first gland seal 15 and the other side connected to the gas extraction system 4, and the second discharge system 6 is made up of the second discharge line having one side connected to the chamber 16*d* of the second gland seal 16 and the other side connected to the gas extraction system 4.

According to this configuration, when the steam turbine 1 is of the double-flow exhaust type, the structures of the first and second gland seals 15 and 16 can be simplified with respect to the existing structure of the gland seal (three seal portions and two chambers) on the premise of supply of the gland steam.

In the steam turbine plant according to the present embodiment, the first discharge line as the first discharge system 5 and the second discharge line as the second discharge system 6 of the shaft seal system of the steam turbine 1 are configured to avoid installation of the pressure regulation mechanism that regulates the pressure by the pressure loss of the fluid.

According to this configuration, when acting on the chambers 15*d* and 16*d* of the first and second gland seals 15 and 16 via the first and second discharge systems 5 and 6, the suction force of the gas extractor 41 is not affected by the pressure regulation mechanism. Therefore, the pressures of the chambers 15*d* and 16*d* can be reliably retained in a high vacuum state by the suction force of the gas extractor 41.

As described above, the method for improving the steam turbine plant according to the first embodiment includes improving the steam turbine plant 100 including: the steam turbine 101 including the turbine rotor 11 rotationally driven by steam supplied from the steam generation source 90, the casing 14 that accommodates the turbine rotor 11 with the first shaft portion 12 on one side in the axial direction and the second shaft portion 13 on the other side in the axial direction of the turbine rotor 11 penetrating, the first gland seal 115 provided in the first gap G1 between the first shaft portion 12 and the casing 14, and the second gland seal 116 provided in the second gap G2 between the second shaft portion 13 and the casing 14; the condenser 3 that condenses and returns, to water, steam discharged from the steam turbine 101; the gas extraction system 4 including the gas extractor 41 that extracts noncondensable gas in the condenser 3 and connected to the condenser 3; the gland steam supply systems 107 and 108 that are connected to the first gland seal 115 and the second gland seal 116 and supply gland steam to the first gland seal 115 and the second gland seal 116; and the discharge systems 105 and 106 having one side in the axial direction connected to the first gland seal 115 and the second gland seal 116 and configured to guide and discharge a gas flowing into the first gland seal 115 and the second gland seal 116 to an outside. The method for improving includes abolishing the gland steam supply systems 107 and 108 and making a modification of connecting the other sides of the discharge systems 105 and 106 to the gas extraction system 4 such that the gas flowing into the first gland seal 115 and the second gland seal 116 is guided to the gas extractor 41 without passing through the condenser 3.

This method for improving allows the outside air flowing into the first gland seal and the second gland seal to be sucked by using the gas extractor 41 that retains the degree of vacuum of the condenser 3, thus allowing for, even by abolishing the gland steam supply systems 107 and 108, preventing inflow of the outside air into the steam turbine via the first gland seal and the second gland seal. Therefore, it is possible to simplify the shaft seal system of the steam turbine while preventing inflow of outside air into the steam turbine.

The method for improving the steam turbine plant according to the present embodiment is a method for improving a configuration. In the configuration, the steam turbine 101 is made up of a double-flow exhaust turbine in which steam supplied from the steam generation source 90 is divided in two directions, rotationally drives the turbine rotor 11, and is discharged from two directions of one side in the axial direction and the other side in the axial direction of the turbine rotor 11, the first gland seal 115 includes the first seal portion 115*a*, the second seal portion 115*c*, and the third seal portion 115*b* disposed in this order at intervals from the outer side to the inner side of the steam turbine 101 and includes the first chamber 115*e* sectioned by the first seal portion 115*a* and the second seal portion 115*c*, and the second chamber 115*f* sectioned by the second seal portion 115*c* and the third seal portion 115*b*, the second gland seal 116 includes the first seal portion 116*a*, the second seal portion 116*c*, and the third seal portion 116*b* disposed in this order at intervals from the outer side to the inner side of the steam turbine 101 and includes the first chamber 116*e* sectioned by the first seal portion 116*a* and the second seal portion 116*c*, and the second chamber 116*f* sectioned by the second seal portion 116*c* and the third seal portion 116*b*, one side in the axial direction of the discharge system 105 is connected to the first chamber 115*e* of the first gland seal 115, and one side in the axial direction of the discharge system 106 is connected to the first chamber 116*e* of the second gland seal 116. The method for improving includes modifying the first gland seal 115 and the second gland seal 116 such that the second seal portions 115*c* and 116*c* in the first gland seal 115 and the second gland seal 116 are abolished and one chamber is sectioned by the first seal portion and the third seal portion.

This method for improving can use, when the existing steam turbine 101 is of the double-flow exhaust type, the first gland seal 115 and the second gland seal 116 that are simpler in structure than the existing first gland seal 15 and second gland seal 16 on the premise of supply of the gland steam.

Second Embodiment

Figure 7:
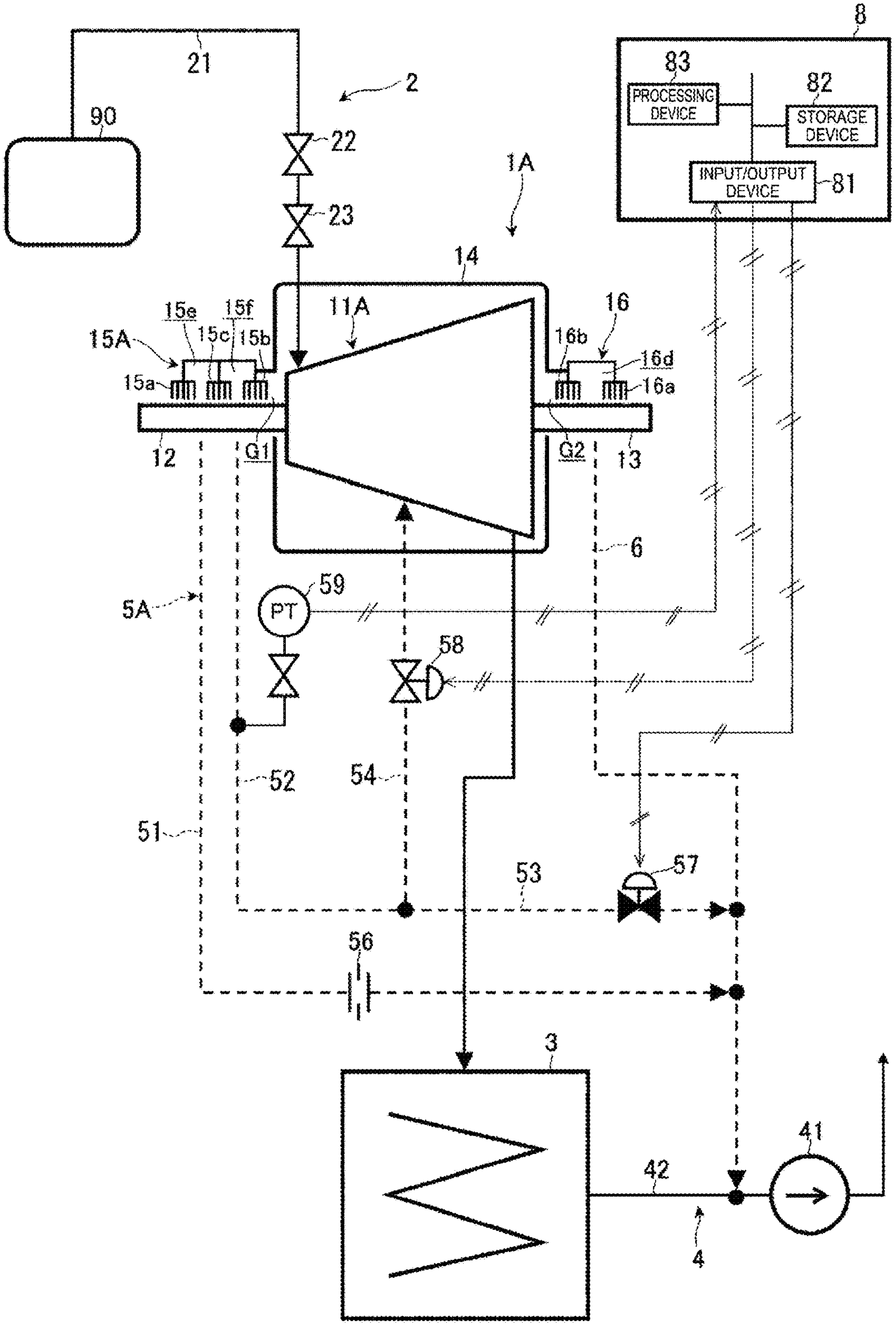
FIG. 7 is a system diagram illustrating a schematic configuration of a steam turbine plant according to a second embodiment of the present invention and a schematic diagram illustrating a schematic configuration of a steam turbine.
Figure 8:
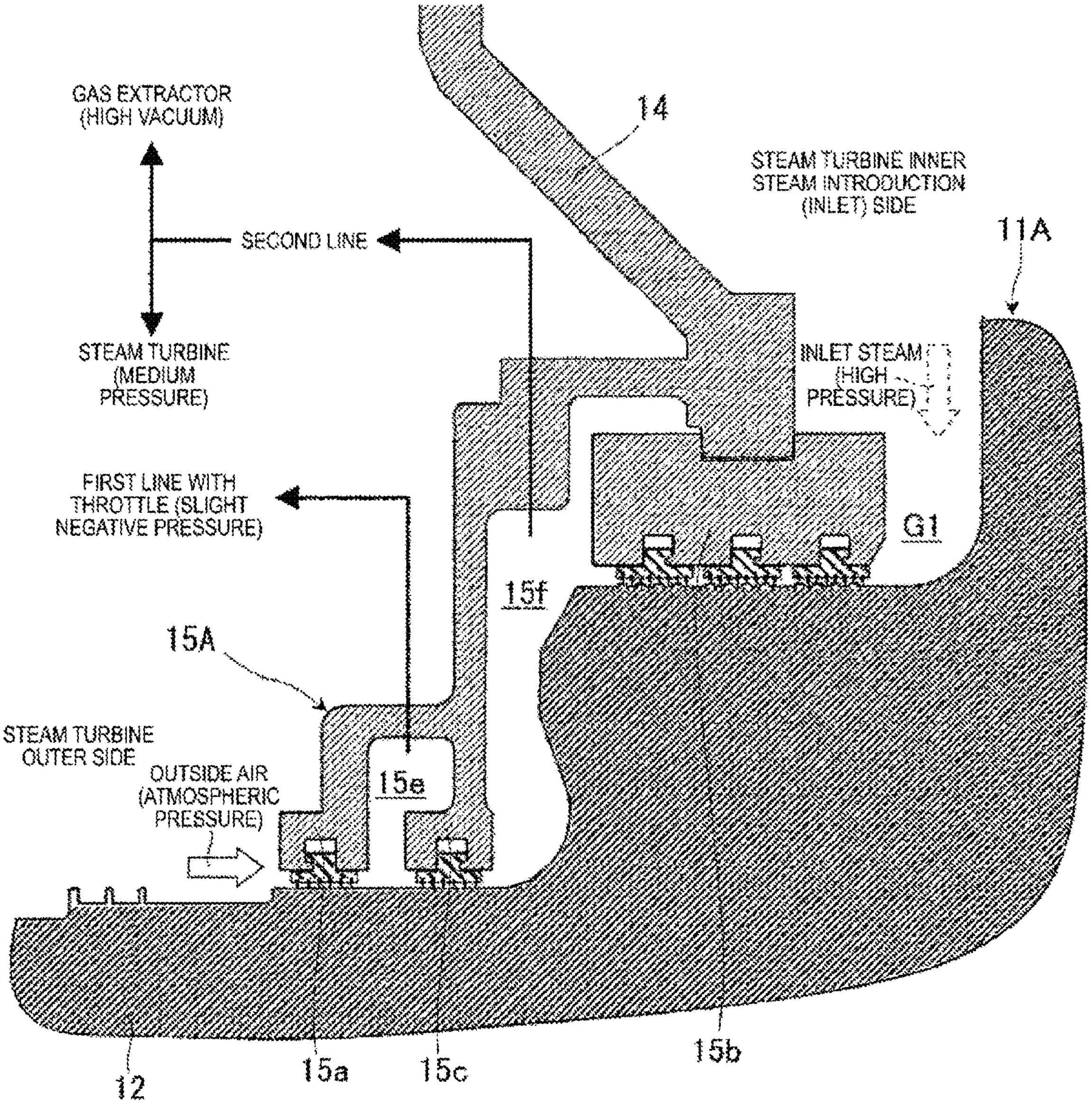
FIG. 8 is a cross-sectional view illustrating a structure of a gland seal (first gland seal) on a steam introduction (inlet) side of the steam turbine in the steam turbine plant according to the second embodiment illustrated in FIG. 7.

Next, the configuration of the steam turbine plant according to the second embodiment of the present invention will be described with reference to FIGS. 7 and 8. FIG. 7 is a system diagram illustrating a schematic configuration of the steam turbine plant according to the second embodiment and a schematic diagram illustrating a schematic configuration of the steam turbine. FIG. 8 is a cross-sectional view illustrating the structure of the gland seal (first gland seal) on the steam introduction (inlet) side of the steam turbine in the steam turbine plant according to the second embodiment illustrated in FIG. 7. In FIGS. 7 and 8, parts having the same reference signs as those illustrated in FIGS. 1 to 6 are similar parts, and thus detailed descriptions thereof will be omitted.

Main differences of the steam turbine plant according to the second embodiment illustrated in FIG. 7 from the steam turbine plant according to the first embodiment are that a steam turbine 1A is made up of a single-flow exhaust turbine instead of a double-flow exhaust turbine and that the configurations of a first gland seal 15A and a first discharge system 5A are different in accordance with the single-flow exhaust turbine.

Specifically, in the single-flow exhaust steam turbine 1A, the steam supplied from the steam generation source 90 flows from one side in the axial direction (left side in FIG. 7) to the other side in the axial direction (right side in FIG. 7) of a turbine rotor 11A without being divided, and is discharged from one direction. The turbine rotor 11A includes a plurality of rotor blade rows from one side in the axial direction that is a steam introduction (inlet) side toward the other side in the axial direction that is a steam discharge (outlet) side. The high pressure steam from the steam generation source 90 flows into one side in the axial direction in the steam turbine 1A and flows toward the other side in the axial direction (right side in FIG. 7) to rotationally drive the turbine rotor 11A while reducing the pressure. The steam having driven the turbine rotor 11A is discharged from the other side in the axial direction of the steam turbine 1A, guided to the condenser 3, condensed in the condenser 3, and returned to water. Therefore, in the steam turbine 1A, one side in the axial direction that is the steam introduction (inlet) side is brought into a high pressure state in load operation of the plant, while the other side in the axial direction that is the steam discharge (outlet) side is in a very low negative pressure close to the pressure in the condenser 3.

Unlike the first gland seal 15 of the first embodiment, the first gland seal 15A of the present embodiment is positioned on the steam introduction (inlet) side of the steam turbine 1A. Therefore, in load operation of the plant, the inner side of the steam turbine 1A in the vicinity of the first gland seal 15A is brought into a high pressure state by the steam to be introduced. On the other hand, the second gland seal 16 of the present embodiment is positioned on the steam discharge (outlet) side of the steam turbine 1A, similarly to the second gland seal 16 of the first embodiment. Therefore, in load operation of the plant, the inner side of the steam turbine 1A in the vicinity of the second gland seal 16 has a negative pressure close to the pressure in the condenser 3.

Since the entire inside of the steam turbine 1A is brought into a state close to vacuum at start-up of the plant, both the steam introduction (inlet) side and the steam discharge (outlet) side of the steam turbine 1A have a very low negative pressure. That is, at start-up of the plant, the first gland seal 15A of the present embodiment is exposed to a state similar to the first gland seal 15 of the first embodiment.

Therefore, as illustrated in FIGS. 7 and 8, the first gland seal 15A is made up of a first seal portion 15*a*, a second seal portion 15*c*, and a third seal portion 15*b* disposed in this order at intervals from the outer side toward the inner side of the steam turbine 1A. The first gland seal 15A includes a first chamber 15*e* sectioned by the first seal portion 15*a* and the second seal portion 15*c*, and a second chamber 15*f* sectioned by the second seal portion 15*c* and the third seal portion 15*b*. The first chamber 15*e* of the first gland seal 15A is formed as a space capable of dividing the outside and the inside of the steam turbine 1A and regulating the relative pressure with respect to the outside of the steam turbine 1A and the adjacent second chamber 15*f*. On the other hand, the second chamber 15*f* of the first gland seal 15A is formed as a space capable of regulating the relative pressure with respect to the inside of the steam turbine 1A and the adjacent first chamber 15*e*.

For example, as illustrated in FIG. 8, the first seal portion 15*a* of the first gland seal 15A is a non-contact seal portion including one labyrinth packing having a plurality of fins. The second seal portion 15*c* is a non-contact seal portion including one labyrinth packing having a plurality of fins, similarly to the first seal portion 15*a*, for example. The third seal portion 15*b* is a non-contact seal portion including three sets of labyrinth packings having a plurality of fins, for example. In the first gland seal 15A, the first chamber 15*e* is formed by the first seal portion 15*a*, the second seal portion 15*c*, and a portion connecting them, and the second chamber 15*f* is formed by the second seal portion 15*c*, the third seal portion 15*b*, and a portion connecting them. The pressure in the first chamber 15*e* is regulated such that the air (outside air) from the outside of the steam turbine 1A and the gas (high pressure steam) from the second chamber 15*f* flow in. The pressure in the second chamber 15*f* is regulated such that the gas (steam or air) from the inside of the steam turbine 1A and the gas (outside air) from the first chamber 15*e* flow in. The second gland seal 16 of the present embodiment has similar configuration and structure to those of the second gland seal 16 of the first embodiment illustrated in FIG. 2, and the description thereof will be omitted.

As illustrated in FIG. 7, the steam turbine plant according to the present embodiment includes a shaft seal system of the steam turbine 1A that does not need supply of gland steam to the first gland seal 15A and the second gland seal 16. The first discharge system 5A connected to the first gland seal 15A is connected to the gas extraction system 4 so as to guide, to the gas extractor 41 without passing through the condenser 3, the gas (air (outside air) from the outside of the steam turbine 1A and steam or air from the inside of the steam turbine 1A) flowing into the first gland seal 15A. Specifically, unlike the first discharge system 5 of the first embodiment, the first discharge system 5A of the present embodiment includes a first line 51 having one side connected to the first chamber 15*e* and the other side connected to the gas extraction system 4, and a second line 52 having one side connected to the second chamber 15*f* and the other side connected to the gas extraction system 4.

A throttle 56 (e.g., orifice) as a pressure regulation mechanism that regulates pressure by pressure loss of a fluid is provided on the first line 51. The throttle 56 as a pressure regulation mechanism regulates the pressure of the first chamber 15*e* of the first gland seal 15A. Specifically, the throttle 56 is configured to retain the pressure of the first chamber 15*e* at a slight negative pressure, which is a pressure slightly lower than the atmospheric pressure outside the steam turbine 1A, with respect to a high vacuum state of the gas extraction system 4 by the suction force of the gas extractor 41.

The second line 52 is made up of a main line 53 connecting the second chamber 15*f* and the gas extraction system 4, and a diverging line 54 diverging from the main line 53 and connected to an intermediate position of the steam turbine 1A (intermediate stage between the first stage and the last stage of the turbine rotor 11A). A part on a downstream side relative to a connection point of the diverging line 54 in the main line 53 is provided with a first on-off valve 57. The first on-off valve 57 switches permission or shut-off of the flow of gas in the main line 53. A second on-off valve 58 is provided on the diverging line 54. The second on-off valve 58 switches permission or shut-off of the flow of gas in the diverging line 54. A part on the first gland seal 15A side in the second line 52 is provided with a pressure sensor 59 that detects the pressure of the gas flowing through the second line 52. The pressure sensor 59 detects a pressure corresponding to the pressure in the second chamber 15*f* of the first gland seal 15A, and outputs a detection signal corresponding to the detected pressure value to a control device 8.

The second discharge system 6 connected to the second gland seal 16 has a similar configuration to the second discharge system 6 of the first embodiment illustrated in FIG. 1, and the description thereof will be omitted.

The control device 8 controls the shaft seal system of the steam turbine 1A, and is electrically connected to the first on-off valve 57, the second on-off valve 58, and the pressure sensor 59. The control device 8 is configured to switch the flow of the gas flowing into the first gland seal 15A by controlling opening/closing of the first on-off valve 57 and the second on-off valve 58 based on the detection value of the pressure sensor 59.

The control device 8 includes, as a hardware configuration, an input/output device 81, a storage device 82 including a ROM and a RAM, and a processing device 83 including a CPU and an MPU. A detection signal (detection value) of the pressure sensor 59 is input to the input/output device 81. The storage device 82 stores a control program including processing according to a flowchart described later and various types of information necessary for execution of the control program. The processing device 83 implements various functions by appropriately reading a control program and various types of information from the storage device 82, appropriately taking in a detection signal (detection value) from the pressure sensor 59, and executing arithmetic processing according to the control program. The input/output device 81 outputs a command signal corresponding to an arithmetic result of the processing device 83 to the first on-off valve 57 and the second on-off valve 58.

Figure 9:
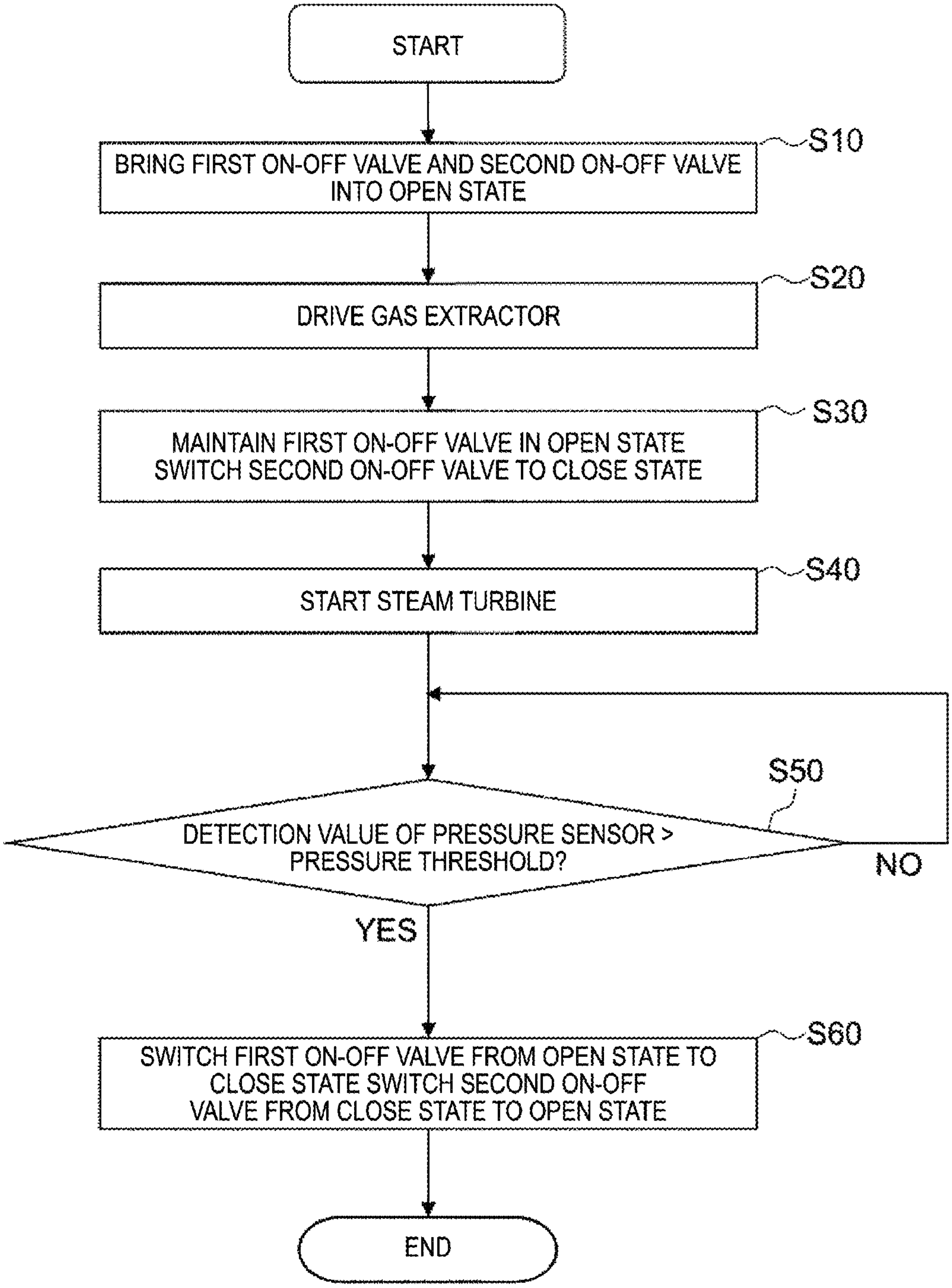
FIG. 9 is a flowchart showing an example of a control procedure for a shaft seal system of the steam turbine of a control device in the steam turbine plant according to the second embodiment illustrated in FIG. 7.

Next, the control procedure of the shaft seal system of the steam turbine by the control device in the steam turbine plant according to the second embodiment will be described with reference to FIG. 9. FIG. 9 is a flowchart showing an example of the control procedure for the shaft seal system of the steam turbine of the control device in the steam turbine plant according to the second embodiment illustrated in FIG. 7.

In FIG. 9, before start-up of the steam turbine 1A, the control device 8 illustrated in FIG. 7 bring the first on-off valve 57 and the second on-off valve 58 (step S10) into an open state and drives the gas extractor 41 (step S20). The gas extractor 41 sucks the gas from the inside of the condenser 3 and the steam turbine 1A, bringing the inside of the condenser 3 and the steam turbine 1A into a state close to vacuum. The drive of the gas extractor 41 can be configured to be controlled by another control device different from the control device 8.

Next, the control device 8 switches the second on-off valve 58 from the open state to the close state while maintaining the first on-off valve 57 in the open state (step 30). Due to this, of the second line 52 of the first discharge system 5A, the main line 53 is in a communicating state, while the diverging line 54 is brought into a shut-off state.

Next, the steam turbine 1A is started up (step S40). That is, the steam of the steam generation source 90 is introduced into the steam turbine 1A via the main steam system 2. The main steam control valve 23 regulates the steam flow rate and the steam pressure introduced into the steam turbine 1A. The start-up of the steam turbine 1A can be configured to be controlled by another control device different from the control device 8.

Subsequently, the control device 8 determines whether the detection value (pressure of the fluid flowing through the second line 52) of the pressure sensor 59 exceeds a pressure threshold value (step S50). If NO in step S50 (the detection value of the pressure sensor 59 is equal to or less than the pressure threshold value), the process returns to step S50 again, and step S50 is repeated until the detection value of the pressure sensor 59 exceeds the pressure threshold value. The pressure threshold value is stored in advance in the storage device 82 and is set to a pressure at which air (outside air) outside the steam turbine 1A cannot flow into the second chamber 15*f* of the first gland seal 15A. The pressure threshold value is set to 1.2 bara, for example.

If YES in step S50, the control device 8 proceeds to step S60 and switches the first on-off valve 57 from the open state to the close state and switches the second on-off valve 58 from the close state to the open state (see the states of the first on-off valve 57 and the second on-off valve 58 illustrated in FIG. 7). Due to this, of the second line 52 of the first discharge system 5A, the main line 53 is brought into a shut-off state, while the diverging line 54 is brought into a communicating state. This is because the steam flowing out from the inside of the steam turbine 1A to the second chamber 15*f* of the first gland seal 15A is recovered to the intermediate stage of the steam turbine 1A via the diverging line 54 of the second line 52. In other words, the control device 8 performs control such that the gas extractor 41 sucks the gas flowing into the second chamber 15*f* of the first gland seal 15A until the pressure of the second chamber 15*f* of the first gland seal 15A becomes a pressure that can block inflow of outside air.

Figure 10:
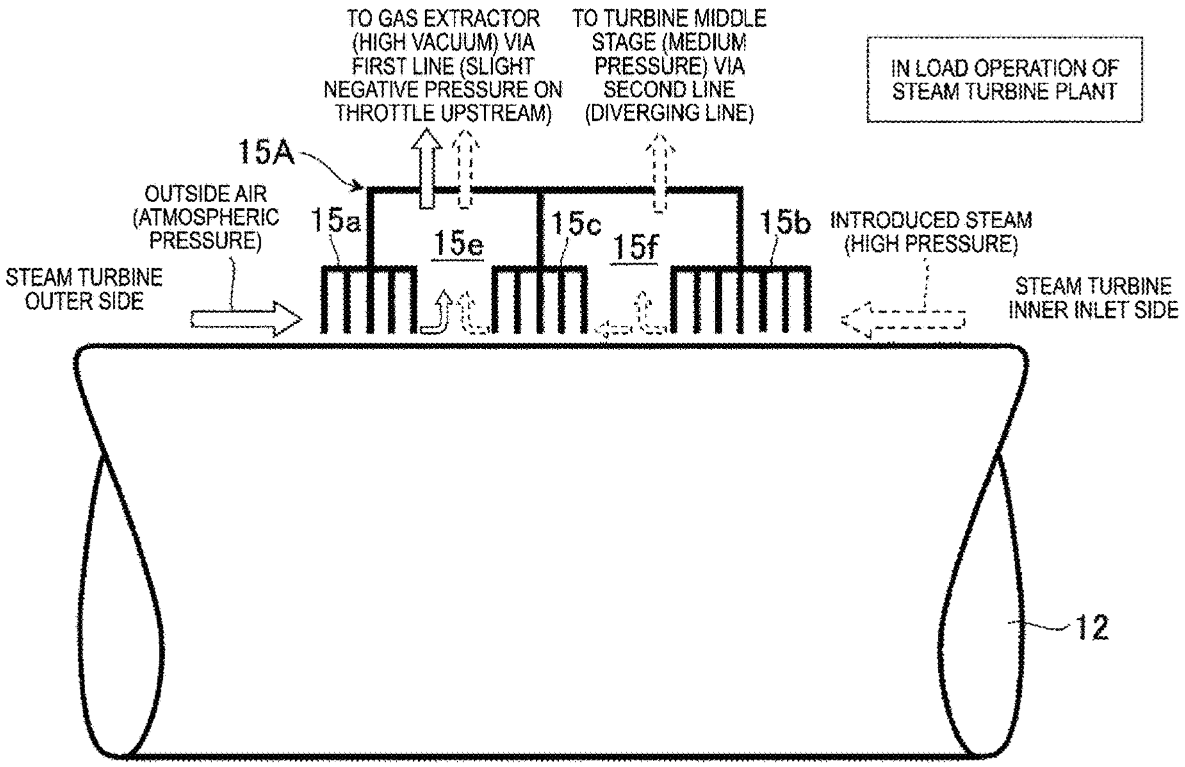
FIG. 10 is an explanatory diagram illustrating an action in plant load operation (in high load operation) of the shaft seal system of the steam turbine in the steam turbine plant according to the second embodiment.
Figure 11:
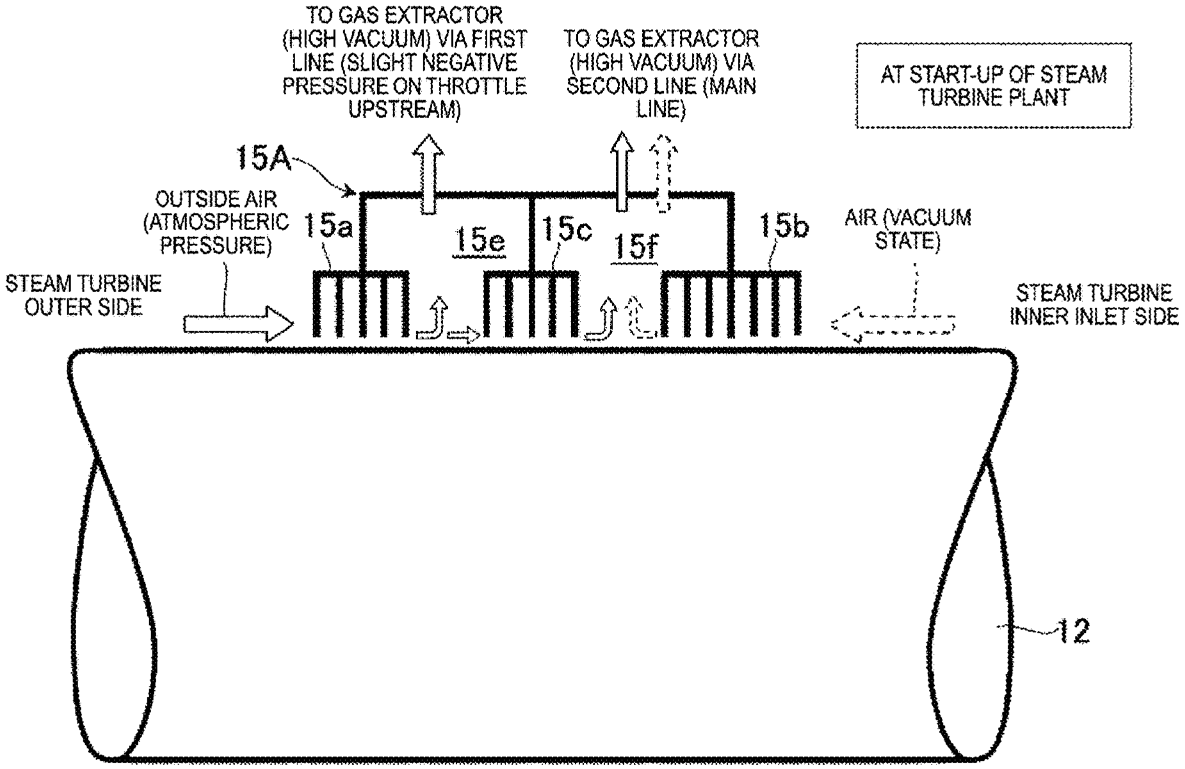
FIG. 11 is an explanatory diagram illustrating an action at start-up of a plant (from vacuum rise to low load operation) of the shaft seal system of the steam turbine in the steam turbine plant according to the second embodiment.

Next, the action of the shaft seal system of the steam turbine in the steam turbine plant according to the second embodiment will be described with reference to FIGS. 7, 10, and 11. FIG. 10 is an explanatory diagram illustrating an action in plant load operation of the shaft seal system of the steam turbine in the steam turbine plant according to the second embodiment. FIG. 11 is an explanatory diagram illustrating an action at start-up of a plant of the shaft seal system of the steam turbine in the steam turbine plant according to the second embodiment. In FIGS. 10 and 11, the solid white arrow indicates the flow of outside air, and the broken white arrow indicates the flow of steam. FIG. 7 illustrates a state of the steam turbine plant in load operation.

When the steam turbine plant according to the present embodiment is during load operation, the high pressure steam supplied to one side in the axial direction (left side in FIG. 7) in the steam turbine 1A illustrated in FIG. 7 rotationally drives the turbine rotor 11A by flowing while reducing the pressure toward the other side in the axial direction (right side in FIG. 7). The steam having driven the turbine rotor 11A is discharged from the other side in the axial direction (one direction) of the steam turbine 1A, is cooled inside the condenser 3, is condensed, and returns to water. This brings the condenser 3 into a state of a very low pressure close to vacuum. The noncondensable gas remaining in the condenser 3 is extracted by the gas extractor 41, retaining the degree of vacuum of the condenser 3 high.

In such a steam turbine plant in load operation, the pressure on the steam introduction (inlet) side on one side in the axial direction inside the steam turbine 1A becomes high, while the pressure on the steam discharge (outlet) side on the other side in the axial direction becomes a negative pressure close to the pressure of the condenser 3. The pressure state on the steam discharge (outlet) side of the steam turbine 1A is a state similar to the pressure state on one side in the axial direction and the pressure state on the other side in the axial direction of the steam turbine 1 of the first embodiment. Therefore, since the functions and actions of the second gland seal 16 of the present embodiment disposed on the steam discharge (outlet) side of the steam turbine 1A are similar to those of the second gland seal 16 of the first embodiment, the description thereof is omitted here.

On the other hand, in the first gland seal 15A disposed on the steam introduction (inlet) side of the steam turbine 1A, as illustrated in FIG. 10, the pressure on the inner side of the steam turbine 1A relative to the third seal portion 15*b* is a high pressure (e.g., about 5 bara) equivalent to the pressure of the introduced steam. On the other hand, the pressure on the outer side of the steam turbine 1A relative to the first seal portion 15*a* of the first gland seal 15A is the pressure of the outside air, that is, the atmospheric pressure. Therefore, the steam on the inner side of the steam turbine 1A tends to flow out to the outside of the steam turbine 1A on a relatively low pressure side via the first gland seal 15A.

In the present embodiment, in load operation of the steam turbine 1A, the first on-off valve 57 on the second line 52 of the first discharge system 5A illustrated in FIG. 7 is controlled into the close state, and the second on-off valve 58 is controlled into the open state. Therefore, the second chamber 15*f* of the first gland seal 15A communicates with the intermediate stage of the steam turbine 1A via the diverging line 54 of the second line 52. Therefore, as illustrated in FIG. 10, the high pressure steam on the inner side of the steam turbine 1A leaks into the second chamber 15*f* via the third seal portion 15*b* of the first gland seal 15A, and most of the steam flowing into the second chamber 15*f* is introduced into the intermediate stage of the steam turbine 1A at a relatively low pressure via the diverging line 54 of the second line 52. The steam introduced into the intermediate stage of the steam turbine 1A becomes energy for rotationally driving the turbine rotor 11A. In this manner, since the steam leaking from the inside of the steam turbine 1A to the first gland seal 15A can be recovered and effectively used in the intermediate stage of the steam turbine 1A, energy loss can be suppressed.

In the present embodiment, since the first chamber 15*e* of the first gland seal 15A illustrated in FIG. 7 is connected to the gas extractor 41 via the first line 51 of the first discharge system 5A, the first chamber 15*e* is in a state of being lower in pressure than the atmospheric pressure by the suction force of the gas extractor 41. However, the pressure of the first chamber 15*e* is regulated to be a slight negative pressure in spite of the suction force of the gas extractor 41 by the throttle 56 as a pressure regulation mechanism provided on the first line 51. Therefore, as illustrated in FIG. 10, the air (outside air) on the outer side of the steam turbine 1A flows into the first chamber 15*e* having a relatively low pressure (slight negative pressure) via the first seal portion 15*a* of the first gland seal 15A, and part of the high pressure steam leaking from the inner side of the steam turbine 1A to the second chamber 15*f* flows into the first chamber 15*e* having a relatively low pressure (slight negative pressure) via the second seal portion 15*c*. Therefore, the outside air (air) and the steam flowing into the first chamber 15*e* are sucked by the gas extractor 41 via the first line 51 of the first discharge system 5A. In this manner, inflow of the outside air (air) into the steam turbine 1A via the first gland seal 15A can be blocked without supplying the first gland seal 15A with the gland steam. Furthermore, outflow of the steam on the inner side of the steam turbine 1A to the outside of the steam turbine 1A via the first gland seal 15A can be suppressed.

The entire inside of the steam turbine 1A is retained in a state close to vacuum by drive of the gas extractor 41 illustrated in FIG. 7 from before start-up of the steam turbine plant according to the present embodiment. That is, a pressure is very low close to vacuum on both the steam introduction (inlet) side, one side in the axial direction and the steam discharge (outlet) side, the other side in the axial direction in the steam turbine 1A.

In the present embodiment, at start-up of the plant, the first on-off valve 57 on the second line 52 of the first discharge system 5A is controlled into the open state and the second on-off valve 58 is controlled into the close state (see step S30 in FIG. 9), and thus, the second chamber 15*f* of the first gland seal 15A communicates with the gas extraction system 4 via the main line 53 of the second line 52. Therefore, the second chamber 15*f* has a very low pressure with a high degree of vacuum due to the suction force of the gas extractor 41. Therefore, as illustrated in FIG. 11, the gas having a pressure close to vacuum existing on the inner side of the steam turbine 1A flows into the second chamber 15*f* via the third seal portion 15*b* of the first gland seal 15A and is sucked by the gas extractor 41 via the main line 53 of the second line 52.

Since the first chamber 15*e* of the first gland seal 15A illustrated in FIG. 7 is connected to the gas extractor 41 via the first line 51 of the first discharge system 5A, the first chamber 15*e* is in a state of being lower in pressure than the atmospheric pressure by the suction force of the gas extractor 41. However, the pressure of the first chamber 15*e* is regulated to be a slight negative pressure in spite of the suction force of the gas extractor 41 by the throttle 56 as a pressure regulation mechanism provided on the first line 51. Therefore, as illustrated in FIG. 11, the air (outside air) on the outer side of the steam turbine 1A flows into the first chamber 15*e* having a relatively low pressure (slight negative pressure) via the first seal portion 15*a* of the first gland seal 15A and is sucked by the gas extractor 41 via the first line 51 of the first discharge system 5A. Part of the outside air (air) flowing into the first chamber 15*e* of the first gland seal 15A also flows into the relatively low pressure second chamber 15*f* having a high degree of vacuum due to the suction force of the gas extractor 41 via the second seal portion 15*c*. The outside air flowing into the second chamber 15*f* is sucked by the gas extractor 41 via the main line 53 of the second line 52 of the first discharge system 5A without flowing into the steam turbine 1A.

In this manner, in the present embodiment, even at start-up of the steam turbine plant, it is possible to block the outside air (air) from flowing into the steam turbine 1A via the first gland seal 15A without supplying the first gland seal 15A with the gland steam.

Figure 12:
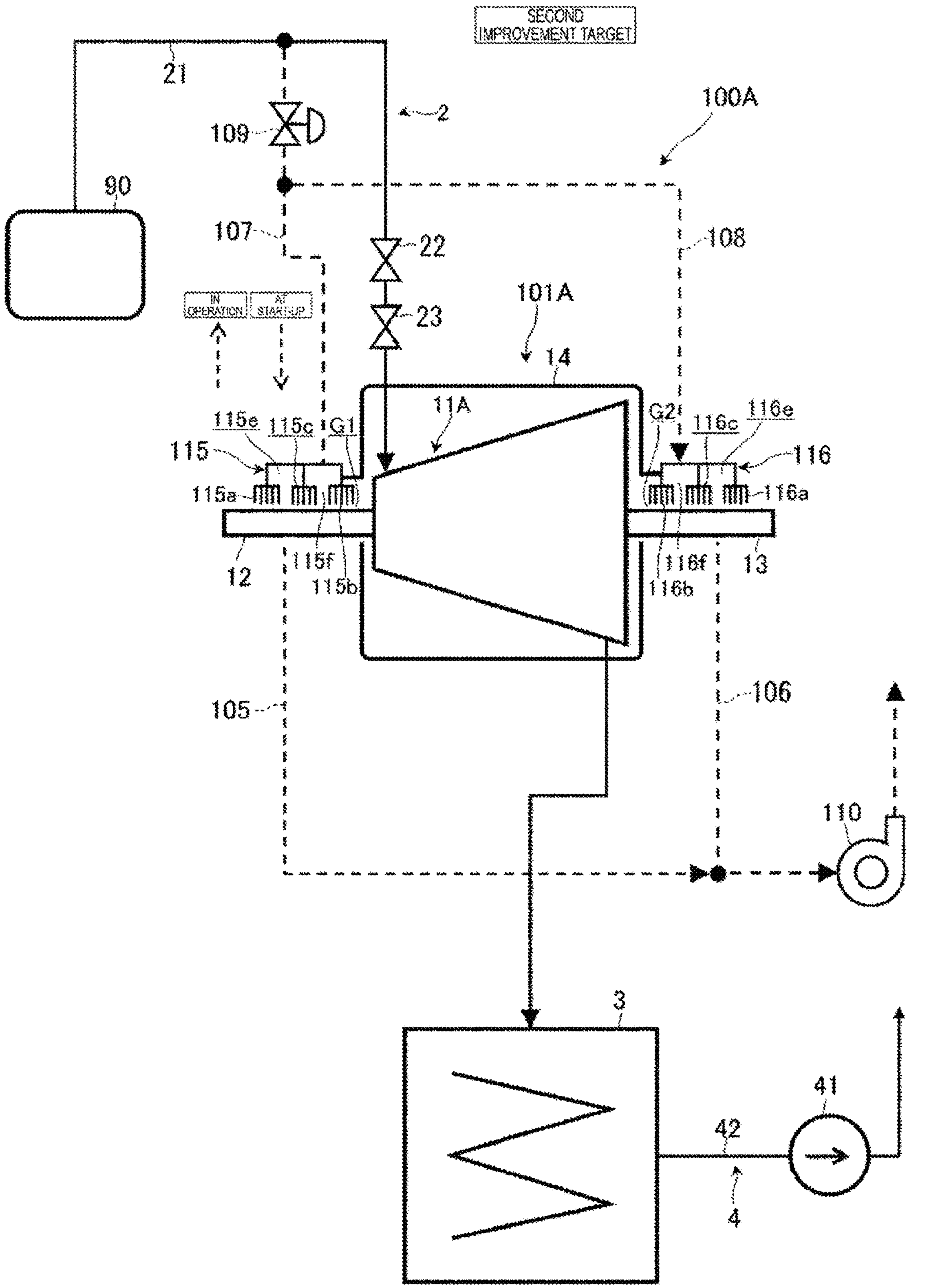
FIG. 12 is a system diagram illustrating a schematic configuration of an existing steam turbine plant that is a second improvement target with respect to the steam turbine plant according to the second embodiment and a schematic diagram illustrating a schematic configuration of an existing steam turbine.

Next, the method for improving the steam turbine plant according to the second embodiment of the present invention will be described. First, a schematic configuration of an existing steam turbine plant of the second improvement target with respect to the steam turbine plant according to the second embodiment will be described with reference to FIG. 12. FIG. 12 is a system diagram illustrating a schematic configuration of the existing steam turbine plant that is the second improvement target with respect to the steam turbine plant according to the second embodiment and a schematic diagram illustrating a schematic configuration of the existing steam turbine. In FIG. 12, parts having the same reference signs as those illustrated in FIGS. 1 to 11 are similar parts, and thus detailed descriptions thereof will be omitted.

The configuration of a steam turbine plant 100A of the second improvement target (existing) illustrated in FIG. 12 is different from the configuration of the steam turbine plant 100 of the first improvement target (existing) illustrated in FIG. 5 in that a steam turbine 101A is made up of a single-flow exhaust turbine instead of a double-flow exhaust turbine and that the operation method for the first gland seal 115 is different in accordance with the difference in the configuration of the steam turbine 101A.

Specifically, the steam turbine 101A in the steam turbine plant 100A of the second improvement target is a single-flow exhaust type in which the steam supplied from the steam generation source 90 flows from one side in the axial direction (left side in FIG. 12) of the turbine rotor 11A to the other side in the axial direction (right side in FIG. 12) without being divided and is discharged from one direction. The turbine rotor 11A includes a plurality of rotor blade rows from one side in the axial direction that is a steam introduction (inlet) side toward the other side in the axial direction that is a steam discharge (outlet) side. The rest of the configuration of the steam turbine plant 100A of the second improvement target is similar to the configuration of the steam turbine plant 100 of the first improvement target described above.

In the steam turbine plant 100A of the second improvement target configured as described above, the shaft seal system of the steam turbine 101A operates as follows at start-up of the plant.

High pressure gland steam is supplied to the second chambers 115*f* and 116*f* of the first and second gland seals 115 and 116 via the gland steam supply systems 107 and 108. Due to this, the second chambers 115*f* and 116*f* have a relatively higher pressure than the pressure (atmospheric pressure) on the outer side of the steam turbine 101A and the pressure (pressure close to the vacuum state) on the inner side of the steam turbine 101A. By driving the gland steam fan 110, the first chambers 115*e* and 116*e* of the first and second gland seals 115 and 116 are made to have a slight negative pressure relatively lower in pressure than the outer side of the steam turbine 101A and the second chambers 115*f* and 116*f*. Due to this, the gland steam supplied to the second chambers 115*f* and 116*f* flows into the steam turbine 101 having a relatively low pressure via the third seal portions 115*b* and 116*b* and flows into the first chambers 115*e* and 116*e* having a relatively low pressure (slight negative pressure) via the second seal portions 115*c* and 116*c*. The air (outside air) on the outer side of the steam turbine 101A flows into the first chambers 115*e* and 116*e* having a relatively low pressure via the first seal portions 115*a* and 116*a*. The gland steam and the outside air flowing into the first chambers 115*e* and 116*e* are sucked by the gland steam fan 110 via the first and second discharge systems 105 and 106. This prevents inflow the outside air (air) into the steam turbine 101A. This is similar to the operation of the shaft seal system of the steam turbine 101 in the steam turbine plant 100 of the first improvement target.

On the other hand, in load operation of the plant, the shaft seal system of the steam turbine 101A operates as follows.

By driving the gland steam fan 110, the first chambers 115*e* and 116*e* of the first and second gland seals 115 and 116 are made to have a slight negative pressure relatively lower in pressure than the outer side of the steam turbine 101A. The high pressure steam on the steam introduction (inlet) side inside the steam turbine 101A leaks out to the second chamber 115*f* of the first gland seal 115, causing the second chamber 115*f* to have a relatively higher pressure than the first chamber 115*e* (slight negative pressure). Therefore, the high pressure steam leaking from the steam introduction (inlet) side in the steam turbine 101A to the second chamber 115*f* flows into the first chamber 115*e* having a relatively low pressure (slight negative pressure) via the second seal portion 115*c* and is supplied from the first supply system 107 to the second chamber 116*f* of the second gland seal 116 through the second supply system 108.

The high pressure steam on the steam introduction (inlet) side in the steam turbine 101A is supplied via the second chamber 115*f* of the first gland seal 115, causing the second chamber 116*f* of the second gland seal 116 to have a relatively higher pressure than the pressure (negative pressure close to the pressure in the condenser 3) on the steam discharge (outlet) side in the steam turbine 101A and the pressure (slight negative pressure) of the first chamber 116*e* of the second gland seal 116. Therefore, the high pressure steam flowing into the second chamber 116*f* flows into the steam discharge (outlet) side inside the steam turbine 101A having a relatively low pressure via the third seal portion 116*b* and flows into the first chamber 116*e* having a relatively low pressure via the second seal portion 116*c*.

The outside air (air) flows into the first chambers 115*e* and 116*e* having a relatively low pressure (slight negative pressure) via the first seal portions 115*a* and 116*a* of the first and second gland seals 115 and 116. The outside air (air) and the high pressure steam flowing into the first chambers 115*e* and 116*e* of the first and second gland seals 115 and 116 are sucked by the gland steam fan 110 via the first and second discharge systems 105 and 106. This prevents inflow of the outside air into the steam turbine 101A via the first and second gland seals 115 and 116.

Next, the method for improving the steam turbine plant according to the second embodiment with respect to the existing steam turbine plant of the second improvement target described above will be described with reference to FIGS. 7 and 12.

As described above, in the steam turbine plant 100A of the second improvement target, as illustrated in FIG. 12, the steam turbine 101A is made up of a single-flow exhaust turbine. The shaft seal system of the steam turbine 101A includes a first gland seal 115 and a second gland seal 116 respectively disposed on an one side in the axial direction (left side in FIG. 12) and the other side in the axial direction (right side in FIG. 12) of the turbine rotor 11A, a gland steam supply system that supplies gland steam to the first gland seal 115 and the second gland seal 116, and a discharge system for guiding and discharging, to the outside, the gas flowing into the first gland seal 115 and the second gland seal 116. The gland steam supply system is configured to include the first supply system 107 connected to the first gland seal 115 and the second supply system 108 connected to the second gland seal 116. The discharge system is made up of the first discharge system 105 connected to the first gland seal 115, the second discharge system 106 connected to the second gland seal 116, and the gland steam fan 110 connected to the first discharge system 105 and the second discharge system 106.

The steam turbine plant 100A of the second improvement target having such a configuration can be improved to a configuration corresponding to the steam turbine plant according to the second embodiment by performing the following modifications.

First, the gland steam supply system including the first supply system 107 and the second supply system 108 in the shaft seal system of the existing steam turbine 101A illustrated in FIG. 12 is abolished. This modification can achieve an improvement into a shaft seal system not requiring supply of gland steam, as the shaft seal system of the steam turbine 1A in the steam turbine plant according to the second embodiment illustrated in FIG. 7.

Second, of the first seal portion 116*a*, the second seal portion 116*c*, and the third seal portion 116*b* of the second gland seal 116 of the steam turbine 101A illustrated in FIG. 12, the second seal portion 116*c* is abolished. With this modification, the seal portion including the first chamber 116*e* sectioned by the first seal portion 116*a* and the second seal portion 1160 and the second chamber 116*f* sectioned by the second seal portion 116*e* and the third seal portion 116*b* is modified to a seal portion including only one chamber sectioned by the first seal portion 116*a* and the third seal portion 116*b*. That is, it is possible to improve the existing second gland seal 116 to a configuration corresponding to the second gland seal 16 (seal portion including only the chamber 16*d* sectioned by the first seal portion 16*a* and the second seal portion 16*b*) of the steam turbine 1A illustrated in FIG. 7 in the steam turbine plant according to the second embodiment.

Third, the gland steam fan 110 constituting a part of the discharge system in the shaft seal system of the existing steam turbine 101A illustrated in FIG. 12 is abolished.

Fourth, in the discharge system of the shaft seal system of the existing steam turbine 101A illustrated in FIG. 12, the portion connected to the gland steam fan 110 of the second discharge system 106 is connected to the gas extraction system 4 so as to guide the gas flowing into the second gland seal 116 to the gas extractor 41 without passing through the condenser 3.

Furthermore, one side connected to the first chamber 116*e* of the existing second gland seal 116 in the existing second discharge system 106 is connected to a portion corresponding to the chamber 16*d* of the second gland seal 16 of the present embodiment obtained by improving the existing second gland seal 116. This modification can achieve an improvement into a configuration corresponding to the second discharge system 6 according to the second embodiment illustrated in FIG. 7.

Fifth, of the existing discharge system illustrated in FIG. 12, the first discharge system 105 including one discharge line connected to the first chamber 115*e* of the first gland seal 115 is modified to include two discharge lines of a first line having one side connected to the first chamber 115*e* and the other side connected to the gas extraction system 4 and a second line having one side connected to the second chamber 115*f* and the other side connected to the gas extraction system 4. Furthermore, the second line is configured to include a main line connecting the second chamber 115*f* and the gas extraction system 4, and a diverging line diverging from the main line and connected to a halfway position (intermediate stage of the turbine rotor 11A) between one side in the axial direction and the other side in the axial direction in the steam turbine 101A. A first on-off valve is provided on the main line of the second line, and a second on-off valve is provided on the diverging line of the second line. A pressure regulation mechanism (e.g., throttle) is provided on the first line. This modification can achieve an improvement into a configuration corresponding to the first discharge system 5A according to the present embodiment illustrated in FIG. 7.

In this manner, improving the existing steam turbine plant 100A of the second improvement target illustrated in FIG. 12 to the steam turbine plant according to the second embodiment allows the outside air flowing into the first and second gland seals 15A and 16 to be sucked, without flowing into the steam turbine 1A, by the gas extractor 41 having a strong suction force for retaining the degree of vacuum of the condenser 3. Therefore, inflow of the outside air into the steam turbine 1A via the first and second gland seals 15A and 16 can be prevented without supplying gland steam to the first and second gland seals 15A and 16.

According to the steam turbine plant according to the second embodiment described above, similarly to the steam turbine plant according to the first embodiment, since the outside air flowing into the first and second gland seals 15A and 16 is sucked by using the gas extractor 41 for retaining the degree of vacuum of the condenser 3, it is possible to prevent inflow of the outside air into the steam turbine 1 via the first and second gland seals 15A and 16 without supplying gland steam to the first and second gland seals 15A and 16. Therefore, the shaft seal system of the steam turbine 1A does not need a facility for supplying the gland steam to the first and second gland seals 15A and 16. That is, it is possible to simplify the shaft seal system of the steam turbine 1A while preventing inflow of outside air into the steam turbine 1A. Furthermore, since the steam supplied as gland steam in the existing shaft seal system can be supplied to the steam turbine 1A, the output of the steam turbine 1A can be increased. Since in the case of a plant using geothermal steam, it is not necessary to use, as gland steam, geothermal steam containing a corrosive component such as chloride or sulfide, the risk of corrosion of the first and second gland seals 15A and 16 can be reduced.

The steam turbine LA in the steam turbine plant according to the present embodiment is made up of a single-flow exhaust turbine in which the steam supplied from the steam generation source 90 flows from one side in the axial direction to the other side in the axial direction of the turbine rotor 11A without being divided and is discharged from one direction. The second gland seal 16 of the steam turbine 1A includes the first seal portion 16*a* and the second seal portion 16*b* disposed at intervals from the outer side toward the inner side of the steam turbine 1A and includes only one chamber 16*d* that is sectioned by the first seal portion 16*a* and the second seal portion 16*b* and is pressure-regulatable. The second discharge system 6 is made up of the second discharge line having one side connected to the chamber 16*d* of the second gland seal 16 and the other side connected to the gas extraction system 4.

According to this configuration, when the steam turbine 1A is of the single-flow exhaust type, the structure of the second gland seal 16 can be simplified as compared with the existing structure of the gland seal (three seal portions and two chambers) on the premise of supply of the gland steam.

In the steam turbine plant according to the present embodiment, the second discharge line as the second discharge system 6 of the shaft seal system of the steam turbine 1A is configured to avoid installation of the pressure regulation mechanism that regulates the pressure by the pressure loss of the fluid.

According to this configuration, when acting on the chamber 16*d* of the second gland seal 16 via the second discharge system 6, the suction force of the gas extractor 41 is not affected by the pressure regulation mechanism.

Therefore, the pressure of the chamber 16*d* can be reliably retained in a high vacuum state by the suction force of the gas extractor 41.

In the steam turbine plant according to the present embodiment, the steam turbine 1A is made up of a single-flow exhaust turbine The first gland seal 15A includes the first seal portion 15*a*, the second seal portion 15*c*, and the third seal portion 15*b* disposed in this order at intervals from the outer side to the inner side of the steam turbine 1A and includes the first chamber ISe sectioned by the first seal portion 15*a* and the second seal portion 15*e* and is pressure-regulatable and the second chamber 15*f* that is sectioned by the second seal portion 15*c* and the third seal portion 15*b* and is pressure-regulatable. The first discharge system 5A is made up of the first line 51 having one side connected to the first chamber 15*e* and the other side connected to the gas extraction system 4, and the second line 52 having one side connected to the second chamber 15*f* and the other side connected to the gas extraction system 4. The second line 52 includes the main line 53 connected to the second chamber 15*f* and the gas extraction system 4, and the diverging line 54 diverging from the main line 53 and connected to a halfway position between one side in the axial direction and the other side in the axial direction in the steam turbine 1A. The first on-off valve 57 is provided on the main line 53 of the second line 52 between the diverging point with the diverging line 54 and the connection point with the gas extraction system 4, and the second on-off valve 58 is provided on the diverging line 54 of the second line 52.

This configuration brings the first on-off valve 57 into the close state and the second on-off valve 58 into the open state in load operation of the single-flow exhaust steam turbine 1A, thus allowing the high pressure steam flowing out from the inside of the steam turbine 1A to the second chamber 15*f* of the first gland seal 15A to be recovered to the steam turbine 1A via the diverging line 54 of the second line 52. Due to this, the high pressure steam leaking into the first gland seal 15A can be effectively utilized as the drive energy of the turbine rotor 11A, and therefore an efficiency decrease of the steam turbine 1A can be suppressed.

In the steam turbine plant according to the present embodiment, the throttle 56 as a pressure regulation mechanism is provided on the first line 51 of the first discharge system 5A.

According to this configuration, since the fluid flowing through the first line 51 have pressure loss generated by the throttle 56, it is possible to regulate the pressure of the first chamber 15*e* of the first gland seal 15A to a slight negative pressure slightly lower than the atmospheric pressure despite the suction force of the gas extractor 41. By retaining the pressure in the first chamber 15*e* at a slight negative pressure, it is possible to suppress the high pressure steam leaking from the inside of the steam turbine 1A to the second chamber 15*f* of the first gland seal 15A in load operation of the steam turbine 1A from being sucked into the gas extractor 41 via the first chamber 15*e* and the first line 51 without being recovered in the steam turbine 1A.

The steam turbine plant according to the present embodiment includes the pressure sensor 59 that detects the pressure corresponding to the pressure in the second chamber 15*f* of the first gland seal 15A, and the control device 8 that controls the first on-off valve 57 and the second on-off valve 58. The control device 8 is configured to bring the first on-off valve 57 and the second on-off valve 58 into the open state before start-up of the steam turbine 1A, bring the first on-off valve 57 into the open state at start-up of the steam turbine 1A and the second on-off valve 58 into the close state, and bring, when the detection value of the pressure sensor 59 exceeds a predetermined pressure threshold value in load operation of the steam turbine 1A, the first on-off valve 57 into the close state and the second on-off valve 58 into the open state.

According to this configuration, the control device 8 controls opening and closing of the first on-off valve 57 and the second on-off valve 58 in accordance with each state before start-up, at start-up, or in load operation of the steam turbine 1A, thus allowing for autonomously recovering, into the steam turbine 1A, the high pressure steam leaking from the inside of the steam turbine 1A to the first gland seal 15A and preventing inflow of outside air into the steam turbine 1A via the first gland seal 15A.

The method for improving the steam turbine plant according to the second embodiment described above includes, similarly to the method for improving the steam turbine plant according to the first embodiment, abolishing the gland steam supply systems 107 and 108 and making a modification of connecting the other sides of the discharge systems 105 and 106 to the gas extraction system 4 such that the gas flowing into the first gland seal 115 and the second gland seal 116 is guided to the gas extractor 41 without passing through the condenser 3.

This method for improving allows the outside air flowing into the first and second gland seals to be sucked by using the gas extractor 41 for retaining the degree of vacuum of the condenser 3, thus allowing for, even by abolishing the gland steam supply systems 107 and 108, preventing inflow of the outside air into the steam turbine via the first and second gland seals. Therefore, it is possible to simplify the shaft seal system of the steam turbine while preventing inflow of outside air into the steam turbine.

The method for improving the steam turbine plant according to the present embodiment is a method for improving a configuration. In the configuration, the steam turbine 101A is made up of a single-flow exhaust turbine in which steam supplied from the steam generation source 90 flows from one side in the axial direction to the other side in the axial direction of the turbine rotor 11A without being divided and is discharged from one direction, the first gland seal 115 includes the first seal portion 115*a*, the second seal portion 115*c*, and the third seal portion 115*b* disposed in this order at intervals from the outer side to the inner side of the steam turbine 101A and includes the first chamber 115*e* sectioned by the first seal portion 115*a* and the second seal portion 115*c*, and the second chamber 115*f* sectioned by the second seal portion 115*c* and the third seal portion 115*b*, the second gland seal 116 includes the first seal portion 116*a*, the second seal portion 116*e*, and the third seal portion 116*b* disposed in this order at intervals from the outer side to the inner side of the steam turbine 101A and includes the first chamber 116*e* sectioned by the first seal portion 116*a* and the second seal portion 116*c*, and the second chamber 116*f* sectioned by the second seal portion 116*e* and the third seal portion 116*b*, and one side in the axial direction of the discharge system 105 is connected to the first chamber 115*e* of the first gland seal 115, and one side in the axial direction of the discharge system 106 is connected to the first chamber 116*e* of the second gland seal 116. The method for improving includes modifying the second gland seal 116 such that the second seal portion 116*c* in the second gland seal 116 is abolished and one chamber is sectioned by the first seal portion and the third seal portion.

This method for improving can use, when the existing steam turbine 101A is of the single-flow exhaust type, the second gland seal 16 simpler in structure than the existing second gland seal 116 on the premise of supply of the gland steam.

The method for improving the steam turbine plant according to the present embodiment is a method for improving a configuration in which the existing steam turbine 101A is made up of a single-flow exhaust turbine, the discharge system of the shaft seal system of the steam turbine 101A includes the first discharge system 105 made up of only the discharge line connected to the first chamber 115*e* of the first gland seal 115 and the second discharge system 106 made up of only the discharge line connected to the first chamber 116*e* of the second gland seal 116. In the method for improving, the first discharge system 105 is modified to include the first line 51 having one side in the axial direction connected to the first chamber 115*e* and the other side in the axial direction connected to the gas extraction system 4, and the second line 52 having one side in the axial direction connected to the second chamber 15*f* and the other side in the axial direction connected to the gas extraction system 4, and the second line 52 is configured to include the main line 53 connecting the second chamber 115*f* and the gas extraction system 4, and the diverging line 54 diverging from the main line 53 and connected to a halfway position between one side in the axial direction and the other side in the axial direction in the steam turbine 1A. Furthermore, the first on-off valve 57 is provided on the main line 53 of the second line 52 between the diverging point with the diverging line 54 and the connection point with the gas extraction system 4, and the second on-off valve 58 is provided on the diverging line 54 of the second line 52.

According to this method for improving, bringing the first on-off valve 57 into the close state and the second on-off valve 58 into the open state in load operation of the single-flow exhaust steam turbine 1A allows the high pressure steam leaking from the inside of the steam turbine 1A to the second chamber 15*f* of the first gland seal 15A to be recovered to the steam turbine 1A via the diverging line 54 of the second line 52 of the first discharge system 5A. Due to this, the high pressure steam leaking into the first gland seal 15A can be effectively utilized as the drive energy of the turbine rotor 11A, and therefore an efficiency decrease of the steam turbine 1A can be suppressed.

In the method for improving the steam turbine plant according to the present embodiment, the throttle 56 as a pressure regulation mechanism is provided on the first line 51.

This method for improving causes the throttle 56 to generate pressure loss in the fluid flowing through the first line 51, thus allowing for regulating the pressure of the first chamber 15*e* of the first gland seal 15A to a slight negative pressure slightly lower than the atmospheric pressure despite the suction force of the gas extractor 41. Retaining the pressure in the first chamber 15*e* at a slight negative pressure can suppress the high pressure steam leaking from the inside of the steam turbine 1A to the second chamber 15*f* of the first gland seal 15A in load operation of the steam turbine 1A from being sucked into the gas extractor 41 via the first chamber 15*e* and the first line 51 without being recovered in the steam turbine 1A.

Other Embodiments

The present invention is not limited to the above-described embodiments and includes various modifications. The above-described embodiments have been described in detail for easy understanding of the present invention and are not necessarily limited to those having all the described configurations. For example, a part of the configuration of a certain embodiment can be replaced with the configuration of another embodiment, and the configuration of another embodiment can be added to the configuration of the certain embodiment. It is also possible to add, delete, and replace other configurations for a part of the configuration of each embodiment.

For example, in the second embodiment described above, an example in which the first discharge system 5A includes the first line 51 having one side connected to the first chamber 15*e* and the other side connected to the gas extraction system 4, and the second line 52 having one side connected to the second chamber 15*f* and the other side connected to the gas extraction system 4 has been described. However, from the viewpoint of simplifying the shaft seal system of the steam turbine 1A while preventing inflow of outside air into the steam turbine 1A, it is also possible to configure the first discharge system with only the first line 51 and delete the second line 52. In this case, it is preferable to delete also the throttle 56 on the first line 51.

REFERENCE SIGNS LIST

1, 1A, Steam turbine, 3, Condenser, 4, Gas extraction system, 5, First discharge system (First discharge line), 5A, First discharge system, 6, Second discharge system (Second discharge line), 8, Control device, 11, 11A, Turbine rotor, 12, First shaft portion, 13, Second shaft portion, 14, Casing, 15, 15A, First gland seal, 15*a*, First seal portion, 15*b*, Second seal portion or third seal portion, 15*c*, Second seal portion, 15*d*, Chamber, 15*e*, First chamber, 15*f*, Second chamber, 16, Second gland seal, 16*a*, First seal portion, 16*b*, Second seal portion. 16*d*, Chamber, 41, Gas extractor, 51, First line, 52, Second line, 53, Main line, 54, Diverging line, 56, Throttle (Pressure regulation mechanism), 57, First on-off valve, 58, Second on-off valve, 59, Pressure sensor, 90, Steam generation source, 101, 101A, Existing steam turbine of improvement target, 105, Existing first discharge system (Discharge line), 106, Existing second discharge system (Discharge line), 107, First supply system (Gland steam supply system), 108, Second supply system (Gland steam supply system), 115, Existing first gland seal, 115*a*, First seal portion, 115*c*, Second seal portion, 115*b*, Third seal portion, 115*e*. First chamber, 115*f*, Second chamber, 116, Existing second gland seal, 116*a*, First seal portion, 116*c*, Second seal portion, 116*b*, Third seal portion, 116*e*, First chamber, 116*f*, Second chamber, G1, First gap, G2, Second gap

The invention claimed is:

1. A steam turbine plant, comprising:

a steam turbine configured to be driven by steam supplied from a steam generation source;

a condenser configured to condense steam discharged from the steam turbine and convert the steam into water; and a gas extraction system including a gas extractor configured to extract noncondensable gas in the condenser and connected to the condenser, wherein the steam turbine includes a turbine rotor that includes a first shaft portion and a second shaft portion on one side in an axial direction and the other side in the axial direction, respectively and is rotationally driven by the steam supplied from the steam generation source, a casing that accommodates the turbine rotor with the first shaft portion and the second shaft portion penetrating, and a first gland seal provided in a first gap between the first shaft portion and the casing and a second gland seal provided in a second gap between the second shaft portion and the casing, only a first discharge system for discharging a gas flowing into the first gland seal is connected to the first gland seal, only a second discharge system for discharging a gas flowing into the second gland seal is connected to the second gland seal, the first discharge system is connected to the gas extraction system so as to guide the gas flowing into the first gland seal to the gas extractor without passing through the condenser, the second discharge system is connected to the gas extraction system so as to guide the gas flowing into the second gland seal to the gas extractor without passing through the condenser, wherein the gas extractor has a capacity equal to or greater than a predetermined threshold value, the threshold value is determined based on a total amount of steam to be condensed required for the condenser, and the threshold value is defined by an equation below:

$$Y=0.75\times10^{(2.881+(1.401\times10^{-6})X)} \quad \text{[Math. 1]}$$

where X represents total amount of steam to be condensed required for the condenser, Y represents the threshold value of the capacity of the gas extractor, and units of X and Y are lb/hr.

2. The steam turbine plant according to claim 1, wherein the steam turbine is made up of a double-flow exhaust turbine in which steam supplied from the steam generation source is divided in two directions, rotationally drives the turbine rotor, and is discharged from two directions of one side in the axial direction and the other side in the axial direction of the turbine rotor, the first gland seal and the second gland seal each include a first seal portion and a second seal portion disposed at an interval from an outer side toward an inner side of the steam turbine, the first gland seal and the second gland seal are each sectioned by the first seal portion and the second seal portion and each include only one chamber that is pressure-regulatable, the first discharge system is made up of a first discharge line having one side in the axial direction connected to the chamber of the first gland seal and the other side in the axial direction connected to the gas extraction system, and the second discharge system is made up of a second discharge line having one side in the axial direction connected to the chamber of the second gland seal and the other side in the axial direction connected to the gas extraction system.

3. The steam turbine plant according to claim 2, wherein the first discharge line and the second discharge line are configured to avoid installation of a pressure regulation mechanism that regulates pressure by pressure loss of fluid.

4. The steam turbine plant according to claim 1, wherein the steam turbine is made up of a single-flow exhaust turbine in which steam supplied from the steam generation source flows from one side in the axial direction to the other side in the axial direction of the turbine rotor without being divided and is discharged from one direction, the second gland seal includes a first seal portion and a second seal portion disposed at an interval from an outer side toward an inner side of the steam turbine, the second gland seal is sectioned by the first seal portion and the second seal portion and includes only one chamber that is pressure-regulatable, and the second discharge system is made up of a second discharge line having one side in the axial direction connected to the chamber of the second gland seal and the other side in the axial direction connected to the gas extraction system.

5. The steam turbine plant according to claim 4, wherein the second discharge line is configured to avoid installation of a pressure regulation mechanism that regulates pressure by pressure loss of fluid.

6. A steam turbine plant, comprising:

a steam turbine configured to be driven by steam supplied from a steam generation source;

a condenser configured to condense steam discharged from the steam turbine and convert the steam into water; and a gas extraction system including a gas extractor configured to extract noncondensable gas in the condenser and connected to the condenser, wherein the steam turbine includes a turbine rotor that includes a first shaft portion and a second shaft portion on one side in an axial direction and the other side in the axial direction, respectively and is rotationally driven by the steam supplied from the steam generation source, a casing that accommodates the turbine rotor with the first shaft portion and the second shaft portion penetrating, and a first gland seal provided in a first gap between the first shaft portion and the casing and a second gland seal provided in a second gap between the second shaft portion and the casing, only a first discharge system for discharging a gas flowing into the first gland seal is connected to the first gland seal, only a second discharge system for discharging a gas flowing into the second gland seal is connected to the second gland seal, the first discharge system is connected to the gas extraction system so as to guide the gas flowing into the first gland seal to the gas extractor without passing through the condenser, the second discharge system is connected to the gas extraction system so as to guide the gas flowing into the second gland seal to the gas extractor without passing through the condenser, the steam turbine is made up of a single-flow exhaust turbine in which steam supplied from the steam generation source flows from one side in the axial direction to the other side in the axial direction of the turbine rotor without being divided and is discharged from one direction, the first gland seal includes a first seal portion, a second seal portion, and a third seal portion disposed in this order at intervals from an outer side toward an inner side of the steam turbine, the first gland seal includes a first chamber that is sectioned by the first seal portion and the second seal portion and is pressure-regulatable and a second chamber that is sectioned by the second seal portion and the third seal portion and is pressure-regulatable, the first discharge system is made up of a first line having one side in the axial direction connected to the first chamber and the other side in the axial direction connected to the gas extraction system and a second line having one side in the axial direction connected to the second chamber and the other side in the axial direction connected to the gas extraction system, the second line includes a main line connected to the second chamber and the gas extraction system and a diverging line diverging from the main line and connected to a halfway position between the one side in the axial direction and the other side in the axial direction of the steam turbine, a first on-off valve is provided on the main line of the second line and between a diverging point with the diverging line and a connection point with the gas extraction system, and a second on-off valve is provided on the diverging line of the second line.

7. The steam turbine plant according to claim 6, wherein a pressure regulation mechanism is provided on the first line.

8. The steam turbine plant according to claim 6, further comprising:

a pressure sensor configured to detect a pressure corresponding to a pressure in the second chamber; and a control device configured to control the first on-off valve and the second on-off valve, wherein the control device is configured to bring the first on-off valve and the second on-off valve into an open state before start-up of the steam turbine, bring the first on-off valve into an open state and the second on-off valve into a close state at start-up of the steam turbine, and bring, when a detection value of the pressure sensor exceeds a predetermined pressure threshold value in load operation of the steam turbine, the first on-off valve into a close state and the second on-off valve into an open state.

9. A method for improving a steam turbine plant, the steam turbine plant including a steam turbine including a turbine rotor rotationally driven by steam supplied from a steam generation source, a casing that accommodates the turbine rotor with a first shaft portion on one side in an axial direction and a second shaft portion on the other side in the axial direction of the turbine rotor penetrating, a first gland seal provided in a first gap between the first shaft portion and the casing, and a second gland seal provided in a second gap between the second shaft portion and the casing, a condenser configured to condense steam discharged from the steam turbine and convert the steam into water, a gas extraction system including a gas extractor configured to extract noncondensable gas in the condenser and connected to the condenser, a gland steam supply system connected to the first gland seal and the second gland seal and configured to supply gland steam to the first gland seal and the second gland seal, and a discharge system having one side in the axial direction connected to the first gland seal and the second gland seal and configured to guide and discharge a gas flowing into the first gland seal and the second gland seal to an outside, the method comprising:

abolishing the gland steam supply system; and making a modification of connecting the other side in the axial direction of the discharge system to the gas extraction system such that a gas flowing into the first gland seal and the second gland seal is guided to the gas extractor without passing through the condenser, wherein the steam turbine is made up of a single-flow exhaust turbine in which steam supplied from the steam generation source flows from one side in the axial direction to the other side in the axial direction of the turbine rotor without being divided and is discharged from one direction, the first gland seal and the second gland seal each include a first seal portion, a second seal portion, and a third seal portion disposed in this order at intervals from an outer side toward an inner side of the steam turbine and include a first chamber sectioned by the first seal portion and the second seal portion and a second chamber sectioned by the second seal portion and the third seal portion, and for a configuration in which the discharge system includes a first discharge system made up of only a discharge line connected to the first chamber of the first gland seal and a second discharge system made up of only a discharge line connected to the first chamber of the second gland seal, the first discharge system is modified to be made up of a first line having one side in the axial direction connected to the first chamber of the first gland seal and the other side in the axial direction connected to the gas extraction system and a second line having one side in the axial direction connected to the second chamber of the first gland seal and the other side in the axial direction connected to the gas extraction system, the second line is configured to include a main line connecting the second chamber of the first gland seal and the gas extraction system and a diverging line diverging from the main line and connected to a half-way position between the one side in the axial direction and the other side in the axial direction of the steam turbine, a first on-off valve is provided on the main line of the second line between a diverging point with the diverging line and a connection point with the gas extraction system, and a second on-off valve is provided on the diverging line of the second line.

10. The method for improving a steam turbine plant according to claim 9, wherein the steam turbine is made up of a double-flow exhaust turbine in which steam supplied from the steam generation source is divided in two directions, rotationally drives the turbine rotor, and is discharged from two directions of one side in the axial direction and the other side in the axial direction of the turbine rotor, the first gland seal and the second gland seal each include a first seal portion, a second seal portion, and a third seal portion disposed in this order at intervals from an outer side toward an inner side of the steam turbine and include a first chamber sectioned by the first seal portion and the second seal portion and a second chamber sectioned by the second seal portion and the third seal portion, and for a configuration in which the one side in the axial direction of the discharge system is connected to the first chamber of the first gland seal and the second gland seal, the first gland seal and the second gland seal are modified such that the second seal portion in the first gland seal and the second gland seal is abolished and that one chamber is sectioned by the first seal portion and the third seal portion.

11. The method for improving a steam turbine plant according to claim 9, wherein the steam turbine is made up of a single-flow exhaust turbine in which steam supplied from the steam generation source flows from one side in the axial direction to the other side in the axial direction of the turbine rotor without being divided and is discharged from one direction, the first gland seal and the second gland seal each include a first seal portion, a second seal portion, and a third seal portion disposed in this order at intervals from an outer side toward an inner side of the steam turbine and include a first chamber sectioned by the first seal portion and the second seal portion and a second chamber sectioned by the second seal portion and the third seal portion, and for a configuration in which the one side in the axial direction of the discharge system is connected to the first chamber of the first gland seal and the second gland seal, the second gland seal is modified such that the second seal portion in the second gland seal is abolished and that one chamber is sectioned by the first seal portion and the third seal portion.

12. The method for improving a steam turbine plant according to claim 9, comprising providing a pressure regulation mechanism on the first line.

* * * * *